(12) United States Patent
Oh et al.

(10) Patent No.: US 11,343,682 B2
(45) Date of Patent: May 24, 2022

(54) METHOD AND APPARATUS FOR CHANNEL ACCESS IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Sungjin Park, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 37 days.

(21) Appl. No.: 16/980,677

(22) PCT Filed: May 10, 2019

(86) PCT No.: PCT/KR2019/005650
§ 371 (c)(1),
(2) Date: Sep. 14, 2020

(87) PCT Pub. No.: WO2019/216704
PCT Pub. Date: Nov. 14, 2019

(65) Prior Publication Data
US 2021/0022015 A1    Jan. 21, 2021

(30) Foreign Application Priority Data

May 10, 2018 (KR) .................. 10-2018-0053942

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0626* (2013.01); *H04L 5/0051* (2013.01);
(Continued)

(58) Field of Classification Search
CPC ... H04W 16/28; H04W 16/14; H04W 52/367; H04W 56/001; H04W 72/042;
(Continued)

(56) References Cited

U.S. PATENT DOCUMENTS 10,499,426 B2  12/2019  Oh et al.
10,736,140 B2   8/2020  Park et al.
(Continued)

FOREIGN PATENT DOCUMENTS

KR    1020170060775    6/2017
WO    WO 2016/167623   10/2016
(Continued)

OTHER PUBLICATIONS

International Search Report dated Aug. 12, 2019 issued in counterpart application No. PCT/KR2019/005650, 21 pages.

*Primary Examiner* — Kiet Tang
(74) *Attorney, Agent, or Firm* — The Farrell Law Firm, P.C.

(57) ABSTRACT

The disclosure relates to a channel access method and apparatus in a wireless communication system. In the method according to an embodiment of the disclosure, a user equipment (UE) may receive configuration information related to a beam used in an unlicensed spectrum and configuration information related to transmission of a synchronization signal block from a base station, determine a threshold value used for a channel access procedure based on the configuration information received from the base station, and transmit a signal through the unlicensed spectrum according to whether the unlicensed spectrum is in an idle state, determined based on the determined threshold value.

15 Claims, 9 Drawing Sheets

(51) Int. Cl.
  *H04L 5/00* (2006.01)
  *H04W 16/14* (2009.01)
  *H04W 52/36* (2009.01)
  *H04W 56/00* (2009.01)
  *H04W 72/04* (2009.01)
(52) U.S. Cl.
  CPC ......... *H04W 16/14* (2013.01); *H04W 52/367* (2013.01); *H04W 56/001* (2013.01); *H04W 72/042* (2013.01); *H04W 72/046* (2013.01)
(58) Field of Classification Search
  CPC . H04W 72/046; H04W 74/08; H04W 74/008; H04W 74/006; H04W 74/0808; H04B 7/0626; H04B 7/0665; H04L 5/0051
  See application file for complete search history.

(56) References Cited

U.S. PATENT DOCUMENTS

| | | |
|---|---|---|
| 2018/0110057 A1 | 4/2018 | Park et al. |
| 2018/0255578 A1 | 9/2018 | Kim et al. |
| 2018/0255579 A1* | 9/2018 | Shimomura .......... H04W 74/08 |
| 2019/0081756 A1* | 3/2019 | Yan .................... H04W 72/042 |
| 2019/0150170 A1 | 5/2019 | Park et al. |
| 2020/0229216 A1* | 7/2020 | Zhu ................... H04W 72/0453 |

FOREIGN PATENT DOCUMENTS

| | | |
|---|---|---|
| WO | WO 2017/047973 | 3/2017 |
| WO | WO 2017/052183 | 3/2017 |
| WO | WO 2017/052193 | 3/2017 |
| WO | WO 2017/155305 | 9/2017 |

* cited by examiner

METHOD AND APPARATUS FOR CHANNEL ACCESS IN WIRELESS COMMUNICATION SYSTEM

PRIORITY

This application is a National Phase Entry of PCT International Application No. PCT/KR2019/005650 which was filed on May 10, 2019, and claims priority to Korean Patent Application No. 10-2018-0053942, which was filed on May 10, 2018, the content of each of which is incorporated herein by reference.

TECHNICAL FIELD

The disclosure relates to a wireless communication system, and more particularly, to a channel access method and apparatus in a wireless communication system.

BACKGROUND ART

To meet the increasing demand with respect to wireless data traffic after the commercialization of $4^{th}$ generation (4G) communication systems, efforts to develop enhanced $5^{th}$ generation (5G) communication systems or pre-5G communication systems are continuing. For this reason, a 5G communication system or pre-5G communication system is called a 'beyond 4G network' communication system or a 'post long term evolution (post-LTE)' system.

To achieve a high data rate, the implementation of a 5G communication system in an ultra-high-frequency (mm-Wave) band (for example, a 60 GHz band) is being considered. To reduce path loss of radio waves and increase a transfer distance of radio waves in an ultra-high-frequency band, in a 5G communication system, technologies for beamforming, massive multiple input multiple output (MIMO), full dimensional MIMO (FD-MIMO), array antenna, analog beam-forming, and large-scale antenna are being discussed.

Also, to improve system networks, various technologies, such as evolved small cell, advanced small cell, cloud radio access network (cloud RAN), ultra-dense networks, device-to-device (D2D) communication, wireless backhaul, moving networks, cooperative communication, coordinated multi-points (CoMP), and interference cancellation, have been developed for 5G communication systems. In addition, hybrid frequency shift keying and quadrature amplitude modulation (FQAK) and sliding window superposition coding (SWSC) based on advanced coding modulation (ACM), and filter bank multi carrier (FBMC), non orthogonal multiple access (NOMA) and sparse code multiple access (SCMA) based on advanced access technology have been developed for 5G communication systems.

Meanwhile, the Internet is evolving from a human-centered network in which humans generate and consume information to an Internet of things (IoT) network in which distributed components such as objects transmit, receive, and process information. Internet of everything (IoE) technology resulting from combining IoT technology with big data processing technology, etc. through connection to a cloud server or the like is on the rise. To implement the IoT, various technical factors, such as sensing technology, wired/wireless communication, network infrastructure, service interface technology, and security technology, are required. Recently, technologies including a sensor network, machine-to-machine (M2M), and machine type communication (MTC) for connections between objects have been studied. In an IoT environment, an intelligent Internet technology (IT) service is provided to collect and analyze data generated by connected objects to create new value for human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Accordingly, various attempts to apply a 5G communication system to an IoT network are being made. For example, technologies, such as a sensor network, M2M, and MTC, are implemented by technologies, such as beam forming, MIMO, and array antenna, which are 5G communication technologies. Applying a cloud radio access network (CRAN) as big data processing technology is also an example of the convergence of 5G technology and IoT technology.

Meanwhile, a need for a method of receiving synchronization signals is on the rise.

DESCRIPTION OF EMBODIMENTS

Technical Problem

The disclosure relates to a channel access procedure and method in a base station, a user equipment (UE), or a transmitting node and a receiving node, which attempt to transmit a downlink signal or a uplink signal through an unlicensed spectrum.

Solution to Problem

The disclosure relates to a channel access method and apparatus in a wireless communication system. In a method according to an embodiment of the disclosure, a user equipment (UE) may receive configuration information related to a beam used in an unlicensed spectrum and configuration information related to transmission of synchronization signal blocks from a base station, determine a threshold value used in a channel access procedure based on the configuration information received from the base station, and transmit a signal through the unlicensed spectrum, according to whether the unlicensed spectrum is in an idle state, which is determined based on the determined threshold value.

Advantageous Effects of Disclosure

According to an embodiment of the disclosure, a transmitting device (a base station or a user equipment (UE)) attempting to transmit a signal through an unlicensed spectrum may perform a channel access procedure in consideration of a variable related to a beam of the signal to be transmitted, thereby more efficiently performing the channel access procedure that is performed in the unlicensed spectrum.

BEST MODE

Figure 1:
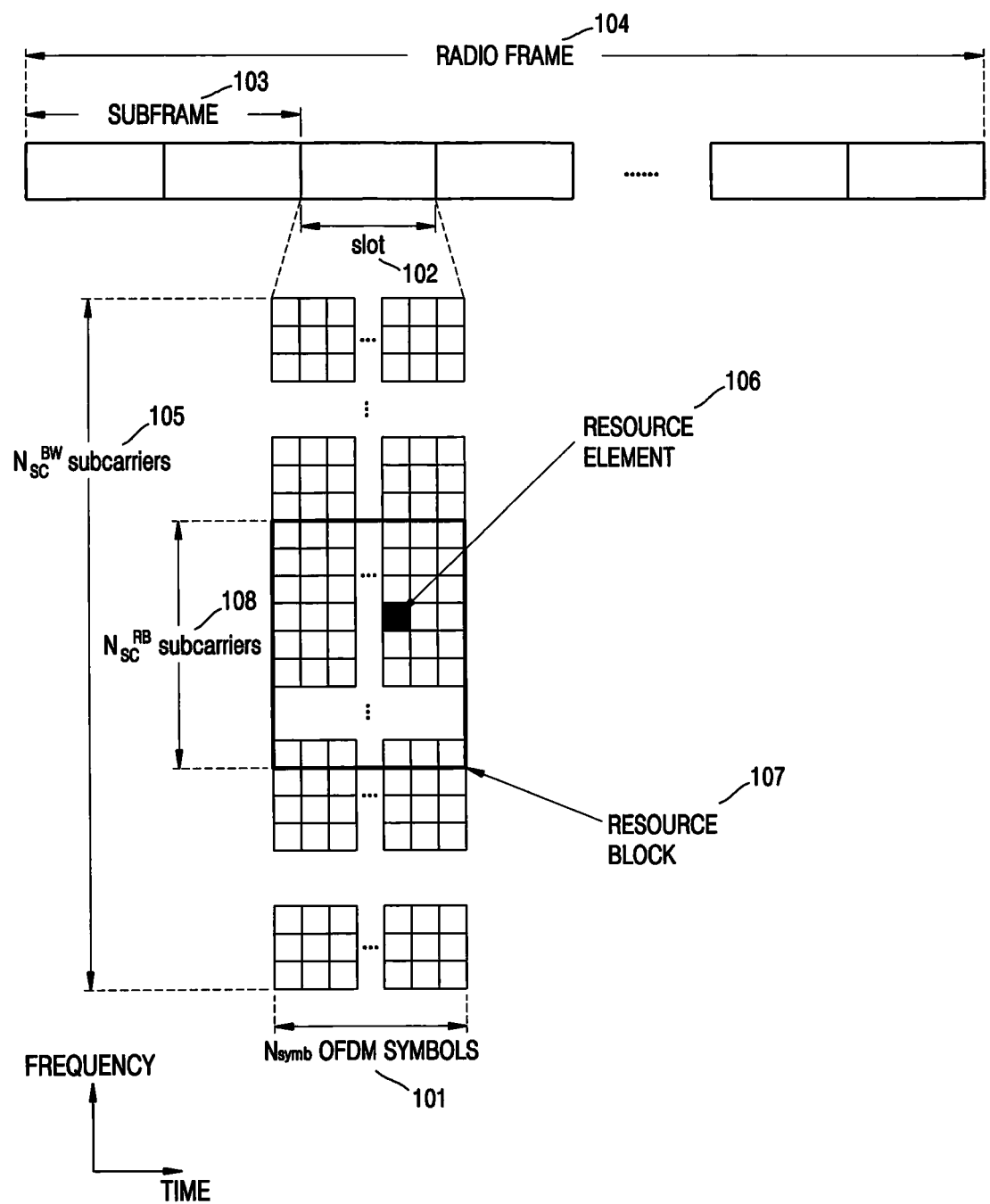
FIG. 1 shows a basic structure of a time-frequency domain as a radio resource region in which data or a control channel is transmitted in uplink/downlink of a new radio (NR) system or a similar system.

A channel access method of a user equipment (UE) in a wireless communication system according to an embodiment includes: acquiring beam configuration information from control information received from a base station; determining a threshold value used as a criterion for determining whether an unlicensed spectrum is in an idle state based on the beam configuration information; and comparing intensity of a signal received in the unlicensed spectrum to the threshold value to determine whether to transmit data in the unlicensed spectrum.

In the channel access method of the UE in the wireless communication system according to an embodiment, the acquiring of the beam configuration information may include determining the number of beams based on the control information received from the base station, wherein the threshold value may be determined based on the number of beams.

In the channel access method of the UE in the wireless communication system according to an embodiment, the number of beams may be determined based on a maximum number of synchronization signal blocks configured in advance according to a frequency band or the number of synchronization signal blocks transmitted from the base station.

In the channel access method of the UE in the wireless communication system according to an embodiment, the acquiring of the beam configuration information may include determining a time period or the number of slots required to transmit a synchronization signal block based on the control information received from the base station, wherein the threshold value may be determined based on the time period or the number of slots required to transmit the synchronization signal block.

In the channel access method of the UE in the wireless communication system according to an embodiment, the acquiring of the beam configuration information may include determining the number of channel-state information reference signals (CSI-RSs) based on the control information received from the base station, wherein the threshold value may be determined based on the number of CSI-RSs.

In the channel access method of the UE in the wireless communication system according to an embodiment, the acquiring of the beam configuration information may include determining maximum transmit power of the base station in a direction of a beam in which the base station attempts to transmit, based on the control information received from the base station, wherein the threshold value may be determined based on the maximum transmit power of the base station in the direction of the beam.

A channel access method of a base station in a wireless communication system according to an embodiment includes: determining beam configuration information related to a beam to be transmitted in an unlicensed spectrum; transmitting control information including the beam configuration information to a User Equipment (UE); and receiving, when it is determined that the unlicensed spectrum is in an idle state according to a threshold value determined by the UE based on the beam configuration information, data from the UE through the unlicensed spectrum, wherein whether the unlicensed spectrum is in an idle state is determined based on a result of comparison between intensity of a signal received by the UE in the unlicensed spectrum and the threshold value.

A user equipment (UE) for channel access in a wireless communication system according to an embodiment, includes: a transceiver; and at least one processor, wherein the at least one processor is configured to acquire beam configuration information from control information received from a base station, determine a threshold value used as a criterion for determining whether an unlicensed spectrum is in an idle state, based on the beam configuration information, and compare intensity of a signal received in the unlicensed spectrum to the threshold value to determine whether to transmit data in the unlicensed spectrum.

In the UE for the channel access in the wireless communication system according to an embodiment, the at least one processor may be further configured to determine the number of beams based on the control information received from the base station, and the threshold value may be determined based on the number of beams.

In the UE for the channel access in the wireless communication system according to an embodiment, the number of beams may be determined based on a maximum number of synchronization signal blocks configured in advance according to a frequency band or the number of synchronization signal blocks transmitted from the base station.

In the UE for the channel access in the wireless communication system according to an embodiment, the at least one processor may be further configured to determine a time period or the number of slots required to transmit a synchronization signal block based on the control information received from the base station, and the threshold value may be determined based on the time period or the number of slots required to transmit the synchronization signal block.

In the UE for the channel access in the wireless communication system according to an embodiment, the at least one processor may be further configured to determine the number of CSI-RSs based on the control information received from the base station, and the threshold value may be determined based on the number of CSI-RSs.

In the UE for the channel access in the wireless communication system according to an embodiment, the at least one processor may be further configured to determine maximum transmit power of a base station in a direction of a beam which the base station attempts to transmit, based on the control information received from the base station, and the threshold value may be determined based on the maximum transmit power of the base station in the direction of the beam.

A base station for channel access in a wireless communication system includes: a transceiver; and at least one processor, wherein the at least one processor is configured to determine beam configuration information related to a beam to be transmitted in an unlicensed spectrum, transmit control information including the beam configuration information to a user equipment (UE), and control, when it is determined that the unlicensed spectrum is in an idle state based on a threshold value determined by the UE based on the beam configuration information, the transceiver to receive data from the UE through the unlicensed spectrum, wherein whether the unlicensed spectrum is in an idle state is determined based on a result of comparison between intensity of a signal received by the UE in the unlicensed spectrum and the threshold value.

Mode of Disclosure

Hereinafter, embodiments of the disclosure will be described in detail with reference to the accompanying drawings. Also, when detailed descriptions about known functions or components associated with the disclosure are determined to unnecessarily obscure the gist of the disclosure, the detailed descriptions will be omitted. Although the following terms are defined in consideration of the functions of the disclosure, they may vary according to a user or operator's intentions, judicial precedents, etc. Hence, the terms must be defined based on the content of the entire specification.

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like elements throughout the specification.

Hereinafter, embodiments of the present disclosure will be described in detail with reference to the accompanying drawings.

When the embodiments are described, descriptions about technical content well known in the technical field to which the disclosure belongs and not directly related to the disclosure will be omitted. The reason is to more clearly transfer the gist of the disclosure by omitting unnecessary descriptions.

For the same reason, some components shown in the drawings may be exaggerated or schematically shown, or some components may be omitted. Also, the sizes of the components may not reflect their actual sizes. In the drawings, the same or corresponding components are assigned like reference numerals.

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that the disclosure will be thorough and complete, and will fully convey the concept of the disclosure to those of ordinary skill in the art, and the disclosure is only defined by the scope of the claims. Like reference numerals denote like elements throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a field programmable gate array (FPGA) or an application specific integrated circuit (ASIC). However, the term 'portion', 'module' or 'unit' is not limited to software or hardware. The 'portion', 'module', or 'unit' may be configured in an addressable storage medium, or may be configured to run on at least one processor. Therefore, as an example, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more central processing units (CPUs) in a device or a security multimedia card. Also, in the embodiments, the 'portion', 'module' or 'unit' may include one or more processors.

A $5^{th}$ generation (5G) system considers supports for more various services compared to a 4G system. For example, representative services include an enhanced mobile broad band (eMBB), ultra-reliable and low latency communication (URLLC), massive machine type communication (mMTC), and evolved multimedia broadcast/multicast Service (eM-BMS). A system providing a URLLC service is called a URLLC system, and a system providing an eMBB service is called an eMBB system. Also, the terms 'service' and 'system' may be used interchangeably.

As such, a plurality of services may be provided to users in a communication system, and to provide a plurality of services to users, a method and device for providing individual services within the same time interval according to features may be required.

Meanwhile, in a wireless communication system (for example, long term evolution (LTE) or long term evolution-advanced (LTE-A) system, or a 5G new radio (NR) system), a base station may transmit downlink control information (DCI) including resource assignment information, etc. for transmitting a downlink signal to a user equipment (UE), through a physical downlink control channel (PDCCH). Thereby, the base station may configure the UE to receive at least one downlink signal of the downlink control information (for example, channel-state information reference signal (CSI-RS)), physical broadcast channel (PBCH), or physical downlink shared channel (PDSCH). For example, the base station may transmit, in a subframe n, DCI instructing the UE to receive PDSCH in the subframe n through PDCCH. After the UE receives the DCI, the UE may receive the PDSCH in the subframe n according to the received DCI.

Also, in the LTE, LTE-A, or NR system, the base station may transmit DCI including uplink resource assignment information to the UE through PDCCH to configure the UE to transmit at least one uplink signal of uplink control information (for example, sounding reference signal (SRS), uplink control information (UCI), or physical random access channel (PRACH)) or physical uplink shared channel (PUSCH) to the base station. For example, when the UE receives uplink transmission configuration information (or uplink DCI or UL grant) transmitted from the base station through PDCCH in a subframe n, the UE may transmit a physical uplink shared channel (hereinafter, referred to as PUSCH), according to a pre-defined time period (for example, n+4), a time period (for example, n+k) configured through a higher layer signal, or uplink signal transmission time indicator information (for example, n+k) included in the uplink transmission configuration information.

When configured downlink transmission is conducted from the base station to the UE through an unlicensed spectrum or configured uplink transmission is conducted from the UE to the base station through the unlicensed spectrum, a transmitting device (the base station or the UE) may perform a channel access procedure or a listen-before talk (LBT) on the unlicensed spectrum for which signal transmission has been configured before or immediately before a configured signal transmission start time, and, when the transmitting device determines that the unlicensed spectrum is in an idle state according to a result of the channel access procedure, the transmitting device may perform the configured signal transmission.

When the transmitting device determines that the unlicensed spectrum is not in an idle state according to the result of the channel access procedure performed by the transmitting device, or when the transmitting device determines that the unlicensed spectrum is in an occupancy state, the transmitting device may not perform the configured signal transmission. A channel access procedure in an unlicensed spectrum for which signal transmission has been configured may be for a transmitting device to receive a signal in the unlicensed spectrum for a predefined time period or a time period (for example, a time period calculated through a random value selected by a base station or a UE) calculated according to a predefined rule, and define intensity of the received signal in advance or compare the received signal to a threshold value calculated by a function configured with at least one variable of a channel bandwidth or a transmission bandwidth of a signal to be transmitted, intensity of transmit power, a beam width of a transmission signal, etc., thereby determining whether the unlicensed spectrum is in an idle state. For example, when intensity of a signal received by the transmitting device for 25 us is smaller than a predefined threshold value −72 dBm, the transmitting device may determine that the unlicensed spectrum is in an idle state, and perform the configured signal transmission.

A maximum signal transmission time period may be limited according to maximum channel occupancy time periods defined by countries or regions for an unlicensed spectrum or kinds of transmitting devices (for example, a base station or a UE, or a master device or a slave device). For example, in Japan, a base station or UE may perform a channel access procedure in an unlicensed spectrum of 5 GHz, and then occupy the channel successively for a time period of maximally 4 ms to transmit signals without performing any additional channel access procedure. When the intensity of the signal received for 25 us is greater than the predefined threshold value −72 dBm, the base station may determine that the unlicensed spectrum is not in an idle state and not perform the configured signal transmission.

In a 5G communication system, various technologies, such as retransmission of code block group units, technology of transmitting uplink signals without uplink scheduling information, etc., will be introduced to provide various services and support a high data rate. Accordingly, to perform 5G communication through an unlicensed spectrum, an efficient channel access procedure considering various variables may be needed.

Wireless communication systems have passed initial stages of providing voice-based services, and are being developed to wide-band wireless communication systems of providing high-speed, high-quality packet data services, such as, for example, high speed packet access (HSPA) of the 3GPP, LTE or evolved universal terrestrial radio access (E-UTRA), LTE-advanced (LTE-A), LTE-pro, high rate packet data (HRPD) of the 3GPP2, ultra mobile broadband (UMB), and communication standards of the IEEE 802.16e and the like. Also, a communication standard of 5G or NR as a 5G wireless communication system is being established.

Wireless communication systems including 5G may provide UEs with at least one service of eMBB, mMTC and URLLC. The above-described services may be provided to the same UE for the same time interval. According to some embodiments, eMBB may be a service aiming at high-speed transmission of high-capacity data, mMTC may be a service aiming at minimization of UE power and accesses of multiple UEs, and URLLC may be a service aiming at high reliability and low delay, although not limited thereto. The three services described above may be important scenarios in a LTE system or a 5G/NR system as a post-LTE system.

When a base station schedules data corresponding to an eMBB service in a certain UE in a specific transmission time interval (TTI), a situation in which the base station needs to transmit URLLC data in the specific TTI may occur. In this situation, the base station may transmit the URLLC data in a frequency band already scheduling and transmitting the eMBB data without transmitting a part of the eMBB data in the frequency band. The UE in which the eMBB data has been scheduled and a UE in which the URLLC data has been scheduled may be the same UE or different UEs. In this case, because a part of the eMBB data already scheduled and being transmitted is not transmitted, a probability that the eMBB data will be damaged may increase. Accordingly, methods of processing a received signal and receiving a signal in the UE in which the eMBB data has been scheduled or the UE in which the URLLC data has been scheduled may need to be determined.

Hereinafter, the embodiments of the disclosure will be described in detail with reference to the accompanying drawings. Also, when detailed descriptions about known functions or components associated with the disclosure are determined to unnecessarily obscure the gist of the disclosure, the detailed descriptions will be omitted. Also, although the following terms are defined in consideration of the functions of the disclosure, they may vary according to a user or operator's intentions, judicial precedents, etc. Hence, the terms must be defined based on the content of the entire specification. Hereinafter, a base station, which is a subject for assigning resources to UEs, may be at least one of eNode B, Node B, a wireless access unit, a base station controller, or a node on a network. A terminal may include an UE, a mobile station (MS), a cellular phone, a smartphone, a computer, or a multimedia system capable of performing a communication function. In the disclosure, downlink (DL) means a wireless transmission path of signals transmitted from a base station to a UE, and uplink (UL) means a wireless transmission path of signals transmitted from a UE to a base station. Also, hereinafter, embodiments of the disclosure are described based on an example of a LTE or LTE-A system, however, the embodiments of the disclosure may also be applied to other communication systems having similar technical backgrounds or channel types. For example, the other communication systems may include 5G mobile communication technologies (5G and NR) that are developed after LTE-A. Also, the embodiments of the disclosure may be applied to other communication systems through slight modifications within a range that does not greatly deviate from the scope of the disclosure, under a determination of a person having a skilled technical knowledge in the technical art to which the disclosure belongs.

As a representative example of a wide-band wireless communication system, a NR system may adopt an orthogonal frequency division multiplexing (OFDM) method in DL, and adopt both the OFDM method and a single carrier frequency division multiple access (SD-FDMA) method in UL. The uplink means a wireless link through which a UE (or a terminal) or a MS transmits data or control signals to a base station (or eNode B), and the downlink means a wireless link through which a base station transmits data or control signals to a UE. A multiple access method assigns and operates time-frequency resources in which data or control information is carried for individual users such that the time-frequency resources do not overlap, that is, such that orthogonality is fulfilled, thereby distinguishing data or control information of the individual users from each other.

The NR system adopts a hybrid automatic repeat request (HARQ) of retransmitting, when a decoding error is generated upon initial transmission, the corresponding data in a physical layer. The HARQ method is for a receiver to transmit, when the receiver has failed to correctly decode data, information (negative acknowledgement (NACK)) informing a decoding error to a transmitter to enable the transmitter to retransmit the corresponding data in a physical layer. The receiver may combine the data retransmitted by the transmitter with the data on which decoding has failed, thereby raising data reception performance. Also, when the receiver correctly has decoded data, the receiver may transmit information (acknowledgement (ACK)) informing a decoding success to the transmitter to enable the transmitter to transmit new data.

FIG. 1 shows a basic structure of a time-frequency domain as a radio resource region in which data or a control channel is transmitted in uplink/downlink of a NR system or the similar system.

Referring to FIG. 1, a horizontal axis represents a time domain, and a vertical axis represents a frequency domain. A minimum transmission unit in the time domain is an OFDM or DFT-s-OFDM symbol, and $N_{symb}$ OFDM symbols 101 or $N_{symb}$ DFT-s-OFDM symbols may form a slot 102. Herein, the OFDM symbol represents a symbol for a case of transmitting and receiving a signal by using the OFDM method, and the DFT-s-OFDM symbol represents a symbol for a case of transmitting and receiving a signal by using the DFT-s-OFDM or SC-FDMA multiplexing method. Hereinafter, in the disclosure, the OFDM symbol and the DFT-s-OFDM symbol are collectively referred to as an OFDM symbol, for convenience of description. Also, embodiments which will be described below will be described based on transmission/reception of downlink signals, for convenience of description. However, the embodiments may also be applicable to transmission/reception of uplink signals.

When a subcarrier spacing is 15 kHz, a slot may configure a subframe 103, and a length of each of the slot and the subframe 103 may be 1 ms. The number and length of slots configuring a subframe 103 may depend on a subcarrier spacing. For example, when a subcarrier spacing is 30 kHz, four slots may configure a subframe 103, wherein a length of the slots may be 0.5 ms and a length of the subframe 103 may be 1 ms. Also, a radio frame 104 may be a time domain interval configured with 10 subframes. A minimum transmission unit in the frequency domain may be a subcarrier, and a bandwidth of an entire system transmission band may be configured with $N_{SC}^{BW}$ subcarriers 105. However, numerical values given above are only examples, and may vary. For example, in a LTE system, a subcarrier spacing may be 15 kHz, two slots may configure a subframe 103, a length of each slot may be 0.5 ms, and a length of the subframe 103 may be 1 ms.

A basic unit of a resource in a time-frequency domain may be a resource element (RE) 106, and may be represented with an OFDM symbol index and a subcarrier index. A resource block (RB or a physical resource block (PRB)) 107 may be defined as $N_{symb}$ successive OFDM symbols 101 in the time domain and $N_{SC}^{RB}$ successive subcarriers 108 in the frequency domain. Accordingly, the RB 107 in the slot 102 may include $N_{symb} \times N_{SC}^{RB}$ REs 106. Generally, a minimum data assignment unit in the frequency domain may be the RB 107.

In the NR system, generally, $N_{symb}=14$, $N_{SC}^{RB}=12$, and $N_{SC}^{BW}$ $N_{SC}^{RB}$ may may be proportional to a bandwidth of a system transmission band. In the LTE system, generally, $N_{symb}=7$, NRB=12, and $N_{SC}^{BW}$ and $N_{SC}^{RB}$ may be proportional to a bandwidth of a system transmission band.

Downlink control information may be transmitted within first N OFDM symbols in a subframe. Generally, N={1, 2, 3}, and a UE may receive a configuration about the number of symbols in which downlink control information is transmittable through a higher layer signal from a base station. Also, the base station may change the number of symbols in which downlink control information is transmittable for each subframe according to an amount of control information that needs to be transmitted in a current subframe, and transfer information about the number of symbols to the UE through a downlink control channel.

In the NR or LTE system, scheduling information about downlink data or uplink data may be transferred from the base station to the UE through DCI. The DCI may be defined according to various formats, and each format may represent whether the DCI is scheduling information (UL grant) for uplink data or scheduling information (DL grant) for downlink data, whether the DCI is compact DCI having a small amount of control information, whether the control information is fall-back DCI, whether to apply spatial multiplexing using multiple antennas, whether the DCI is DCI for power control, etc. For example, a DCI format (for example, DCI format 1_0 of NR) representing scheduling control information (DL grant) for downlink data may include at least one of control information listed below.

DCI format identifier: identifier indicating a format of received DCI

Frequency domain resource assignment: indicate a RB assigned for data transmission Time domain resource assignment: indicate a slot and symbol assigned for data transmission VRB-to-PRB mapping: indicate whether to apply a VRB mapping method Modulation and coding scheme (MCS): indicate a modulation method used for data transmission and a size of a transport block which is data to be transmitted New data indicator: indicate HARQ initial transmission or retransmission Redundancy version: indicate a redundancy version of HARQ HARQ process number: indicate a process number of HARQ PDSCH assignment information (downlink assignment index): indicate a UE of the number (for example, the number of HARQ-ACKs) of PDSCH reception results that will be reported to a base station Transmit power control (TPC) command for physical uplink control channel (PUCCH): indicate a transmit power control command for PUCCH which is an uplink control channel PUCCH resource indicator: indicate a PUCCH resource used for a HARQ-ACK report including a reception result for PDSCH configured through the corresponding DCI PDSCH-to-HARQ_feedback timing indicator: indicate information about a slot or symbol in which PUCCH for a HARQ-ACK report including a reception result for PDSCH configured through the corresponding DCI will be transmitted DCI may be transmitted on PDCCH (or referred to as control information) or enhanced PDCCH (EPDCCH) (or referred to as enhanced control information) which is a downlink physical control channel through a channel coding and modulation process.

Generally, DCI may be scrambled to a specific radio network temporary identifier (RNTI) (or referred to as a UE identifier C-RNTI) independently for each UE to add cyclic redundancy check (CRC), and after being subject to channel coding, the DCI may be configured as independent PDCCH and transmitted. PDCCH in the time domain may be mapped and transmitted during a control channel transmission interval. A frequency domain mapping position of PDCCH may be determined by an identifier (ID) of each UE, and the PDCCH may be transmitted over an entire system transmission band.

Downlink data may be transmitted on PDSCH which is a physical channel for downlink data transmission. The PDSCH may be transmitted after the control channel transmission interval, and scheduling information, such as a detailed mapping position in the frequency domain, a modulation method, etc., may be determined based on DCI that is transmitted through the PDCCH.

Through MCS of control information configuring the DCI, a base station may notify a UE of a modulation method applied to the PDSCH to be transmitted and a size (transport block size (TBS)) of data to be transmitted. According to some embodiments, the MCS may be configured with 5 bits or more or less bits than 5 bits. Also, the TBS may correspond to a size of data (transport block (TB)) that the base station will transmit, before channel coding for error correction is applied to the data.

Modulation methods supported by the NR system may be quadrature phase shift keying (QPSK), quadrature amplitude modulation (16QAM), 64QAM, and 256QAM, and modulation orders Qm of QPSK, 16QAM, 64QAM, and 256QAM may be 2, 4, 6, and 8 respectively. That is, the QPSK modulation may transmit 2 bits for each symbol, the 16QAM may transmit 4 bits for each symbol, the 64QAM may transmit 6 bits for each symbol, and the 256QAM may transmit 8 bits for each symbol. Also, upper-level modulation methods than 256QAM may be used according to system modification.

In the NR system, uplink/downlink HARQ may adopt an asynchronous HARQ method in which a data retransmission time is not fixed. For example, in downlink, when a base station receives feedback HARQ NACK for initial transmission data that it has transmitted from a UE, the base station may freely determine a transmission time of retransmission data by scheduling. The UE may buffer data determined to be an error as a result of decoding on received data for HARQ operation, and then combine the data with data retransmitted from the base station. HARQ ACK/NACK information of PDSCH transmitted in a subframe n−k may be transmitted from the UE to the base station through PUCCH or PUSCH in a subframe n.

In a 5G communication system such as NR, a k value may be included in DCI indicating or scheduling reception of the PDSCH transmitted in the subframe n-k and transmitted, or the k value may be configured by the UE through a higher layer signal. In this case, the base station may configure one or more k values to higher layer signals and indicate a specific k value through DCI. In this case, the k value may be determined according to HARQ-ACK processing capability of the UE, in other words, a minimum time required for the UE to receive PDSCH and generate and report HARQ-ACK for the PDSCH. Also, the UE may use a predefined value or a default value before receiving the configuration of the k value.

Wireless communication systems and the method and apparatus proposed in the embodiments of the disclosure have been described based on the NR system, however, the content of the disclosure is not limited to the NR system and may be applied to various wireless communication systems, such as LTE, LTE-A, LTE-A-Pro, 5G, etc. Also, the content of the disclosure has been described based on the system of transmitting and receiving signals by using an unlicensed spectrum, however, the content of the disclosure may also be applicable to a system that operates in a licensed band.

In descriptions about the wireless communication systems and the disclosure which will be described below, higher layer signaling or a higher layer signal may be a signal transfer method for transmission from a base station to a UE by using a physical layer downlink data channel or from the UE to the base station by using a physical layer uplink data channel, and may include a signal transfer method for transmission through RRC signaling, PDCP signaling or a MAC control element (CE).

In a system that performs communication in an unlicensed spectrum, a transmitting device (a base station or a UE) that attempts to transmit a signal through the unlicensed spectrum may perform a channel access procedure (or listen-before talk (LBT)) on the unlicensed spectrum with which the transmitting device attempts to communicate before transmitting the signal, and, when the transmitting device determines that the unlicensed spectrum is in an idle state according to the channel access procedure, the transmitting device may transmit the signal. When the transmitting device determines that the unlicensed spectrum is not in an idle state according to the channel access procedure, the transmitting device may not transmit the signal.

The channel access procedure in the unlicensed spectrum is for the transmitting device to measure intensity of a signal received through the unlicensed spectrum for a fixed time period or a time period (for example, a time period calculated through a random value selected by at least a base band or UE) calculated according to a predefined rule, and compare the intensity of the signal to a predefined threshold value or a threshold value X_thresh_max calculated by a function configured with at least one variable of a channel bandwidth, a bandwidth in which a signal to be transmitted is transmitted, intensity of transmit power, etc. to determine a magnitude of received signal intensity, thereby determining whether the unlicensed spectrum is in an idle state.

For example, the transmitting device may measure intensity of a signal for 25 us immediately before a time at which the signal will be transmitted, and when the intensity of the signal is smaller than a predefined or calculated threshold value (for example, −72 dBm), the transmitting device may determine that the unlicensed spectrum is in an idle state, and transmit the signal. A maximum time period allowing successive signal transmission after the channel access procedure may be limited according to a maximum channel occupancy time defined by each country, region, or frequency band according to each unlicensed spectrum. Also, the maximum time period may be limited according to a kind of the transmitting device (for example, a base station or a UE, or a master device or a slave device). For example, in Japan, when a base station or UE performs a channel access procedure in an unlicensed spectrum of 5 GHz, the base station or UE may occupy the channel successively in the unlicensed spectrum determined to be in an idle state for a time period of maximally 4 ms to transmit signals without performing any additional channel access procedure.

More specifically, when a base station or UE attempts to transmit a downlink or uplink signal in an unlicensed spectrum, a channel access procedure that may be performed by the base station or UE may be classified into types described below.

Type 1: transmit an uplink/downlink signal after sensing an unlicensed spectrum channel for a variable time period Type 2: transmit an uplink/downlink signal after sensing an unlicensed spectrum channel for a fixed time period Type 3: transmit an uplink or downlink signal without sensing no channel Hereinafter, in the disclosure, a case in which a base station transmits a downlink signal to a UE through an unlicensed spectrum will be assumed and described, however, content proposed in the disclosure may also be applied in the same way or through some modifications to a case in which a UE transmits a uplink signal to a base station through an unlicensed spectrum. Accordingly, a detailed description about uplink signal transmission will be omitted. Also, in the disclosure, a case in which a base station transmits one piece of downlink data information (codeword or TB) to a single UE will be assumed and described. However, content proposed in the disclosure may also be applied to a case of transmitting a downlink signal to two or more UEs or a case of transmitting two or more codewords or TBs to a UE.

A base station that attempts to transmit a signal to an unlicensed spectrum may determine a type of a channel access procedure according to a type of the signal to be transmitted. For example, when the base station attempts to transmit a downlink signal including a downlink data channel to an unlicensed spectrum, the base station may perform a channel access procedure of Type 1. When the base station attempts to transmit a downlink signal (for example, a synchronization signal or a downlink control channel) including no downlink data channel to the unlicensed spectrum, the base station may perform a channel access procedure of Type 2 and transmit the downlink signal.

At this time, the type of the channel access procedure may be determined according to a transmission length of the signal to be transmitted to the unlicensed spectrum or a length of a time period or interval for which the signal occupies and uses the unlicensed spectrum. Generally, the channel access procedure of Type 1 may be performed for a longer time than the channel access procedure of Type 2. Accordingly, when a signal needs to be transmitted for a short time interval or for a time period that is shorter than or equal to a reference time period (for example, a X ms or Y symbol), the channel access procedure of Type 2 may be performed. Meanwhile, when a signal needs to be transmitted for a long time interval or for a time period that is longer than the reference time period (for example, the X ms or Y symbol), the channel access procedure of Type 1 may be performed. In other words, different types of channel access procedures may be performed according to use time periods of the unlicensed spectrum.

When the channel access procedure of Type 1 is performed according to at least one of the above-described criteria, a channel access priority class may be determined according to a quality of service class identifier (QCI) of a signal to be transmitted to the unlicensed spectrum, and the channel access procedure may be performed by using at least one value of configuration values defined in advance as shown in Table 1 with respect to the determined channel access priority class. For example, QCI 1, QCI 2, and QCI 4 may represent QCI values for services, such as conversational voice, conversational video (live streaming), and non-conversational video (buffered streaming), respectively. When the base station attempts to transmit a signal for a service matching no QCI of Table 1 to the unlicensed spectrum, the base station may select a QCI that is closest to the service from among QCIs of Table 1, and select a channel access priority class for the QCI.

Table 1 shows a mapping relationship between channel access priority classes and QCIs.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

For example, a defer duration, a group of contention window values or sizes, minimum and maximum values (CW_min,p, CW_max,p) of the contention window, a maximum channel occupancy time (T_mcot,p), etc. according to a determined channel access priority class p may be determined from Table 2. In other words, when the base station attempts to transmit a downlink signal to the unlicensed spectrum, the base station may perform a channel access procedure on the unlicensed spectrum for a time period of minimally T_f+m_p*T_sl. When the base station attempts to perform a channel access procedure according to a channel access priority class 3 (p=3), the base station may configure a size T_f+m_p*T_sl of a defer duration required to perform the channel access procedure by using m_p=3. When it is determined that the unlicensed spectrum is in an idle state for the entire duration of m_p*T_sl, N=N−1. Herein, N may be selected as an arbitrary integer value among values between 0 and a contention window value CW_p when the channel access procedure is performed. A minimum contention window value and a maximum contention window value of the channel access priority class 3 may be 15 and 63, respectively. When it is determined that the unlicensed spectrum is in an idle state for the defer duration and an additional channel access procedure execution duration, the base station may transmit a signal through the unlicensed spectrum during a time period 8 ms of T_mcot,p. Meanwhile, Table 2 shows channel access priority classes in downlink. In the disclosure, downlink channel access priority classes will be described for convenience of description. However, the channel access priority classes of Table 2 may be reused in uplink, or channel access priority classes for uplink transmission may be newly defined and used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value CW_p may be a minimum value CW_min,p of a contention window. When the base station selects a N value, the base station may perform a channel access procedure for a duration of T_sl. When the base station determines that the unlicensed spectrum is in an idle state through the channel access procedure performed for the duration of T_sl, the base station may change the N value to N=N−1, and when N=0, the base station may transmit a signal through the unlicensed spectrum for a time period of maximally T_mcot,p. When the base station determines that the unlicensed spectrum is not in an idle state through the channel access procedure in the time period of T_sl, the base station may again perform a channel access procedure without changing the N value.

The contention window value CW_p may change based on a reception result for a downlink data channel in a reference subframe or a reference slot in a downlink signal transmission duration (or MCOT) transmitted last through the unlicensed spectrum from the base station, when the base station starts a channel access procedure or when or immediately before the base station selects a N value to perform a channel access procedure. In other words, the base station may be reported a reception result for transmitted downlink data from the UE in a reference subframe or a reference slot, and increase or minimize the contention window value CW_p according to a portion Z of NACK among the reported reception result.

Figure 2:
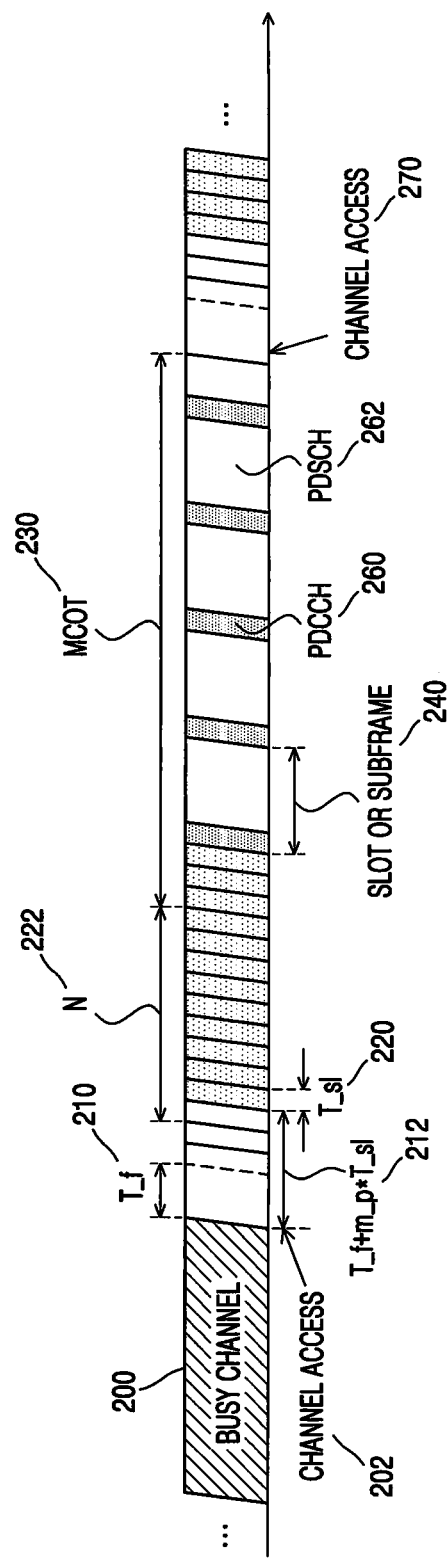
FIG. 2 shows a channel access procedure in an unlicensed spectrum.

FIG. 2 shows a channel access procedure in an unlicensed spectrum.

Referring to FIG. 2, when a base station is reported, from a UE, a downlink data channel reception result for a first subframe 240 of a downlink signal transmission interval 230 transmitted last through an unlicensed spectrum at a time 270 when the base station starts a channel access procedure or at a time when or immediately before the base station selects a N value described above with reference to FIG. 1 to perform a channel access procedure, the first subframe 240 may become a reference subframe. When the base station is reported no downlink data channel reception result for the first subframe 240 from the UE, for example, when a time interval between the first subframe 240 and the time 270 at which the base station starts the channel access procedure is less than or equal to n slots or a subframe, in other words, when the base station starts the channel access procedure before a time at which the UE can report a downlink data channel reception result for the first subframe 240, a first subframe of a downlink signal transmission interval transmitted immediately before the downlink signal transmission interval 230 may become a reference subframe. In other words, in the case in which the base station fails to receive a reception result for downlink data transmitted in the reference subframe from the UE at the time 270 when the base station starts the channel access procedure or at the time when or immediately before the base station selects the N value to perform the channel access procedure, the base station may determine a first subframe of a downlink signal transmission interval received last among reception results for a downlink data channel received in advance from UEs, to be a reference subframe. Also, the base station may determine a contention window value to be used in the channel access procedure by using downlink data reception results received from the UEs for downlink data transmitted in the reference subframe through the downlink data channel.

For example, the base station may transmit a downlink signal through a channel access procedure (for example, CW_p=15) configured through the channel access priority class 3 (p=3). In this case, when the base station determines that reception results corresponding to 80% or more of reception results from the UE for downlink data transmitted to the UE through a downlink data channel in a first subframe, among downlink signals transmitted through the unlicensed spectrum, are NACK, the base station may increase the contention window value from the initial value CW_p=15 to a next contention window value CW_p=31.

When the base station does not determine that the reception results corresponding to 80% or more of the reception results from the UE are NACK, the base station may maintain the content widow value or change the contention window value to its initial value. At this time, changing the contention window value may be applied in common to all channel access priority classes, or may be applied only to the channel access priority class used for the channel access procedure. A method of determining a reception result that is valid for a determination on whether to change the contention window value, among reception results for downlink data transmitted through the downlink data channel, transmitted or reported from the UE to the base station, in a reference subframe or a reference slot for determining whether to change the contention window value, in other words, a method of determining a Z value may be as follows.

When the base station transmits one or more codewords or TBs to one or more UEs in a reference subframe or a reference slot, the base station may determine a Z value as a portion of NACK among reception results transmitted or reported from the UEs, for the TBs received by the UEs in the reference subframe or the reference slot. For example, when two codewords or two TBs are transmitted to a UE in a reference subframe or a reference slot, the base station may receive or be reported downlink data signal reception results for the two TBs from the UE. When a portion Z of NACK of two reception results is equal to or greater than a predefined threshold value or a threshold value (for example, Z=80%) configured between the base station and the UE, the base station may change or increase the contention window value.

When the UE bundles downlink data reception results for one or more subframes (for example, M subframes) including a reference subframe or a reference slot and transmits or reports the downlink data reception results to the base station, the base station may determine that the UE has transmitted M reception results. Then, the base station may determine a Z value as a portion of NACK among the M reception results, and change, maintain, or initialize the contention window value.

When a reference subframe is a reception result for a second slot of two slots configuring a subframe, the base station may determine a Z value as a portion of NACK among reception results transmitted or reported from the UE to the base station for downlink data received in the reference subframe (for example, the second slot) and the following subframe.

Also, in the case in which scheduling information or downlink control information for a downlink data channel transmitted from the base station is transmitted in the same cell or frequency band as a cell or frequency band in which the downlink data channel is transmitted, or in the case in which the scheduling information or downlink control information for the downlink data channel transmitted from the base station is transmitted through an unlicensed spectrum or in a cell or frequency band that is different from the cell or frequency band in which the downlink data channel is transmitted, the base station may determine a reception result of the UE as NACK to determine a Z value when the base station determines that the UE has transmitted no reception result for the downlink data received in the reference subframe or the reference slot and when the base station determine that the reception result for the downlink data transmitted from the UE is DTX, NACK/DTC, or any state.

Also, in the case in which the scheduling information or downlink control information for the downlink data channel transmitted from the base station is transmitted through a licensed band, the base station may not include a reception result of the UE in a reference value Z for determining whether to change a contention window value when the base station determines that the reception result for downlink data, transmitted from the UE, is DTX, NACK/DTX, or any state. In other words, the base station may ignore the reception result of the UE to determine a Z value.

Also, in the case in which the base station transmits the scheduling information or downlink control information for the downlink data channel through the licensed band, the base station may transmit no downlink data actually (no transmission) although the UE transmits or reports a reception result for downlink data for a reference subframe or a reference slot to the base station. In this case, the base station may ignore the reception result for the downlink data, transmitted or reported from the UE, to determine a Z value.

Hereinafter, a structure of transmitting a synchronization signal and PBCH in a 5G communication system will be described.

Figure 3:
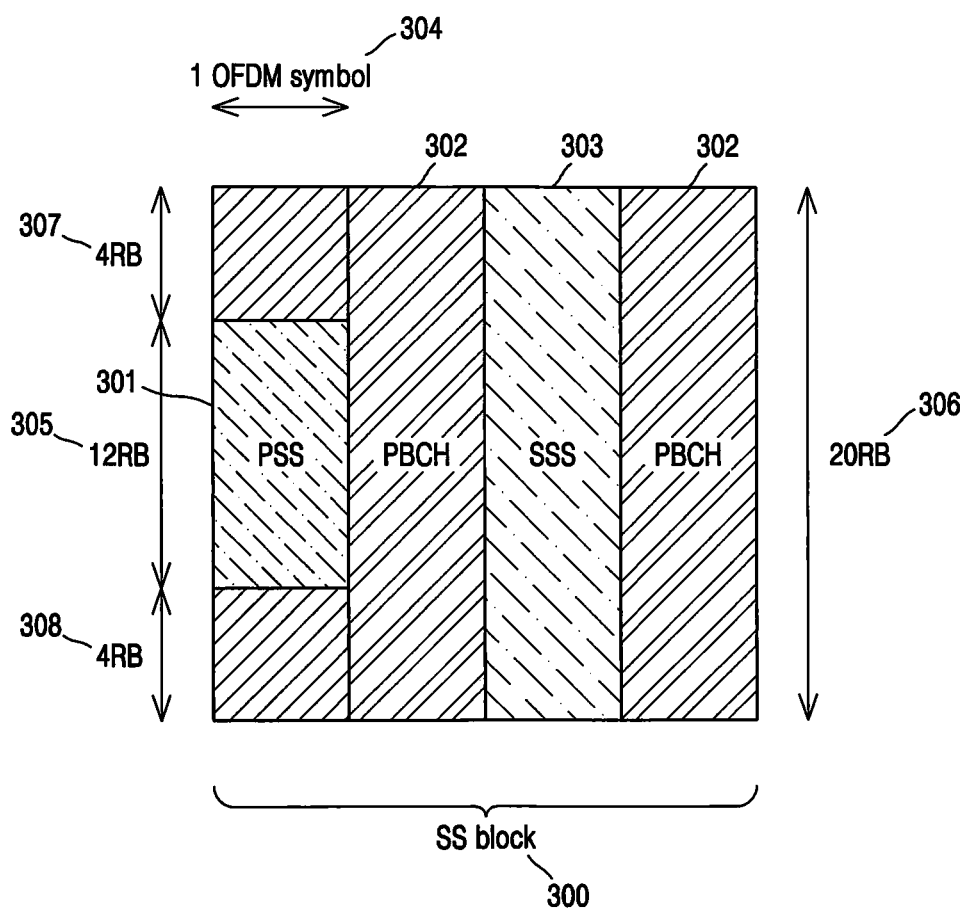
FIG. 3 is a view for describing a synchronization signal block in a $5^{th}$ generation (5G) communication system.

FIG. 3 is a view for describing a synchronization signal block (SS block) 300 in a 5G communication system.

Referring to FIG. 3, the synchronization signal block 300 may be configured with a primary synchronization signal (PSS) 301, a secondary synchronization signal (SSS) 303, and a physical broadcast channel (PSCH) 302. However, the configuration of the synchronization signal block 300 is only an example, and the configuration of the synchronization signal block 300 is not limited to the above example.

The PSS 301 and the SSS 303 may be transmitted in 12 RBs 305 on a frequency axis and an OFDM symbol 304 on a time axis. In 5G, a total of 1008 different cell IDs may be defined. The PSS 301 may have three different values and the SSS 303 may have 336 different values according to physical layer IDs of cells. A UE may detect the PSS 301 and the SSS 303, and identify a cell ID of the 1008 cell IDs based on a combination of the PSS 301 and the SSS 303. For example, the UE may identify a cell ID by using the PSS 301 and SSS 303 according to Equation 1 below.

$$N_{ID}^{cell}=3N_{ID}^{(1)}+N_{ID}^{(2)} \quad \text{[Equation 1]}$$

$N_{ID}^{(1)}$ may be estimated from the SSS 303, and have a value ranging from 0 to 335. $N_{ID}^{(2)}$ may be estimated from the PSS 301, and have a value ranging from 0 to 2. Also, by combining $N_{ID}^{(1)}$ with $N_{ID}^{(2)}$, a $N_{ID}^{cell}$ value as a cell ID may be estimated.

The PBCH 302 may be transmitted in 24 RBs 306 on the frequency axis and 2 OFDM symbols 304 on the time axis. In the PBCH 302, various system information called MIB may be transmitted, and an entirety or a part of the following contents may be transmitted through the PBCH 302.

System frame number (SFN)
MSB of SS/PBCH block index (for above 6 GHz frequency)
Half frame timing
Subcarrier spacing for common control
SS/PBCH subcarrier offset
DMRS type A position for PDSCH
SIB1 PDCCH configuration
Cell barring information
Spare
CRC As described above, the synchronization signal block 300 may be configured with the PSS 301, the SSS 303, and the PSCH 302, and mapped to a total of 4 OFDM symbols on the time axis. A transmission bandwidth (12 RBs) 305 of the PSS 301 and transmission bandwidths (20 RBs) 306 of the SSS 303 and PBCH 302 may be different from each other. Therefore, in the OFDM symbol 304 in which the PSS 301 and SSS 303 are transmitted in a transmission bandwidth (20 RBs) 306 of the PBCH 302, 4 RBs (corresponding to areas 307 and 308 of FIG. 3) positioned at both sides, excluding 12 RBs positioned at the center and transmitting the PSS 301, may exist, and the areas 307 and 308 may be used to transmit different signals or may be empty. The synchronization signal block 300 may be transmitted through the same analog beam. That is, all of the PSS 301, SSS 303, and PBCH 302 may be transmitted through the same beam.

Because an analog beam has a characteristic of being inapplicable to the frequency axis, all frequency-axis RBs in a specific OFDM symbol to which a specific analog beam is applied may be applied the same analog beam. That is, all of four OFDM symbols through which the PSS 301, SSS 303, and PBCH 302 are transmitted may be transmitted through the same along beam.

Figure 4:
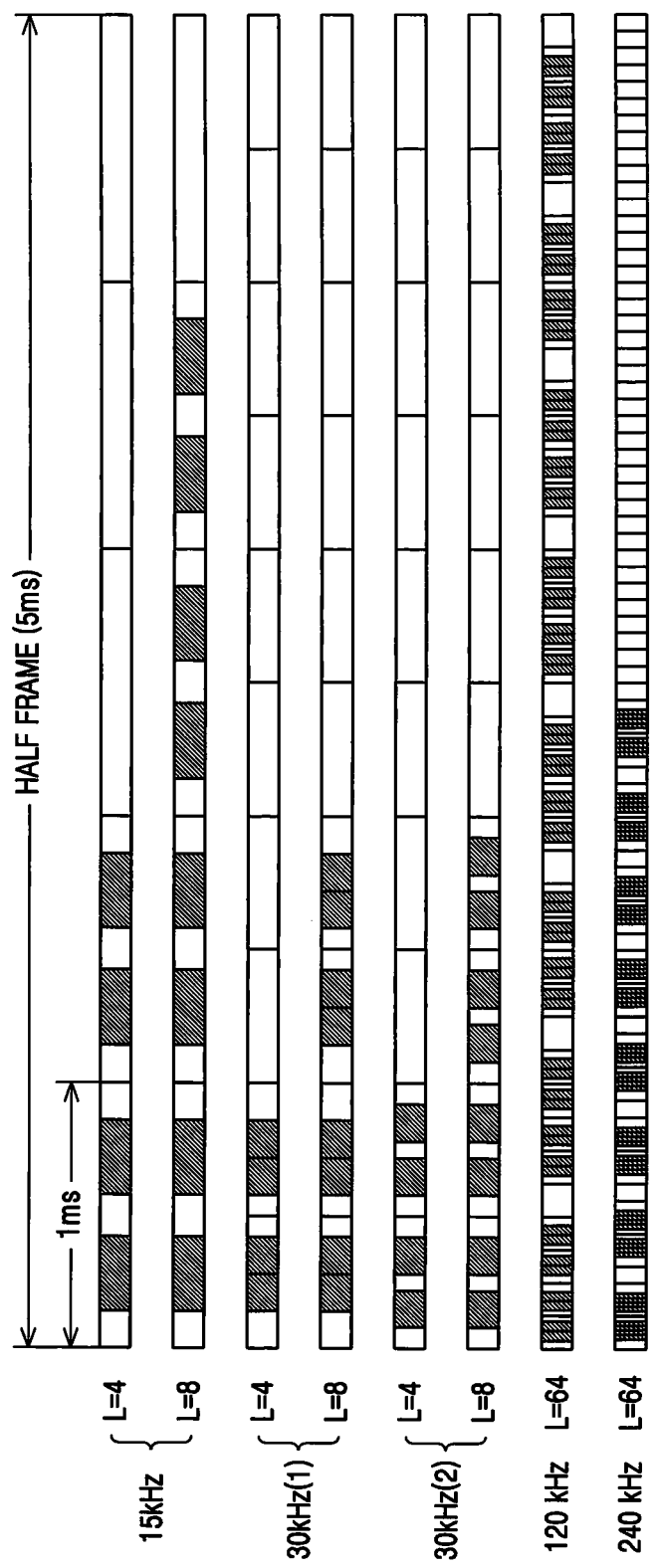
FIG. 4 shows an example of time resource regions of synchronization signal transmitting blocks that are transmittable in a NR system.

A maximum of 64 synchronization signal blocks 300 may be transmittable for a specific time interval (for example, 5 ms), and the number L of the synchronization signal blocks 300 to be transmitted may depend on a value of at least one of a subcarrier spacing of the synchronization signal blocks 300 and a carrier frequency at which the synchronization signal blocks 300 are transmitted. For example, in the time interval, a maximum of 4 synchronization signal blocks 300 may be transmittable at a frequency band of 3 GHz or lower, a maximum of 8 synchronization signal blocks 300 may be transmittable at a frequency band ranging from 3 GHz to 6 GHz, and a maximum of 64 synchronization signal blocks 300 may be transmittable at a frequency band of 6 GHz or higher, which are schematically shown in FIG. 4. FIG. 4 shows an example of time resource regions of synchronization signal blocks that are transmittable in the NR system. Maximum numbers of synchronization signal blocks that are transmittable according to frequency bands are only examples, and are not limited to the examples.

A threshold value X_thresh that is used to determine whether or not an unlicensed spectrum is in an idle state by using a magnitude of a reception signal measured through a channel access procedure may be determined or calculated as follows. When a specific unlicensed spectrum is used by only one system or system group (for example, when only a 3GPP (LTE or NR) system exists without a Wi-Fi system of IEEE in a specific unlicensed spectrum), in other words when it is ensured that other communication systems do not exist in a specific unlicensed spectrum due to a regulatory requirement, etc., the above-described threshold value X_thresh may be calculated according to Equation 2 or Equation 3, below.

$$X\_thresh\_max = \min(T\_max + K\_1, X\_r) \text{ [dBm]} \quad \text{[Equation 2]}$$

In Equation 2, X_r is a maximum threshold value [dBm] defined by a regulatory requirement for a frequency band corresponding to an unlicensed spectrum. The maximum threshold value may have different values according to countries, regions, or frequency bands or may be independently defined. The maximum threshold value may be X_thresh_max=T_max+K_1 or X_r=T_max+K_1 for an unlicensed spectrum not defined by a regulatory requirement. T_max may be a value defined for each country, region, or frequency band, or a maximum value defined in a specification of a system using the unlicensed spectrum. T_max may depend on a frequency bandwidth. For example, in a 3GPP LAA system using an unlicensed spectrum of 5 GHz, a value of T_max may be defined as T_max=10*log 10(3.16228*10−8 (mW/MHz)*BWMHz(MHz)).

When it is not ensured that other communication systems (ok?) do not exist in a specific unlicensed spectrum due to a regulatory requirement, etc., in other words, when a plurality of communication systems share a specific unlicensed spectrum, a threshold value may be calculated based on at least transmit power, a transmission bandwidth, etc. by using the following Equation 3.

$$X\_thresh\_max = \max(T\_a, \min(T\_max, T\_max + T)),$$
$$\text{wherein} \quad \text{[Equation 3]}$$

T_a=−72+10*log 10(BWMHz/BW_ref) dBm, T=−T_A+(P_H+10*log 10(BWMHz/20 MHz)−P_tx). T_A may be configured to a value depending on whether data channel (for example, PDSCH or PUSCH) transmission is included in a signal or channel that a base station or a UE attempts to transmit.

For example, T_A=10 dB may be applied to threshold value calculation for transmission including PDSCH/PUSCH, and T_A=5 dB may be applied in a channel access procedure for transmission including discovery signal or SSB transmission without PDSCH transmission. Herein, P_H may be a value of maximum transmit power or equivalent isotropic radiated power (EIRP) defined in advance by the regulatory requirement, etc. for the unlicensed spectrum in which a signal will be transmitted. For example, P_H may be P_H=23 dBm. The EIRP may be a multiple of power of a transmitter, supplied to an antenna, and an antenna absolute gain based on an isotropic antenna. P_tx may be maximum transmission power or maximum output power configured by the base station. BWMHz may be a bandwidth for a carrier, and may be expressed in unit of MHz.

The above-mentioned values of T_A, P_H and P_tx may be examples, and a value for at least one variable may have been defined in advance or be configured through a higher layer signal. Also, a value for at least one variable among the above-mentioned values of T_A, P_H, or P_tx may be configured independently according to countries or frequency bands, and have different values according to frequency bandwidths. For example, in the case of using a wide frequency bandwidth, a greater value of T_A may be applied to more reduce a threshold value, thereby reflecting signals received over a broader range to a channel access procedure. Calculating the threshold value by using Equation 2 or 3 may be an example, and the threshold value may be calculated by using a modification of Equation 2 or 3 or another Equation.

Meanwhile, in a system, such as the NR system, capable of performing transmission/reception between a base station and a UE by using multiple beams, when a transmitting node compares a magnitude of a reception signal measured without considering a beam direction through a channel access procedure to a threshold value to determine whether an unlicensed spectrum is in an idle state, like the above-described example, there may be a case in which it is unnecessarily determined that the unlicensed spectrum is not in an idle state. The case will be described based on an example of FIG. 5, below.

Figure 5:
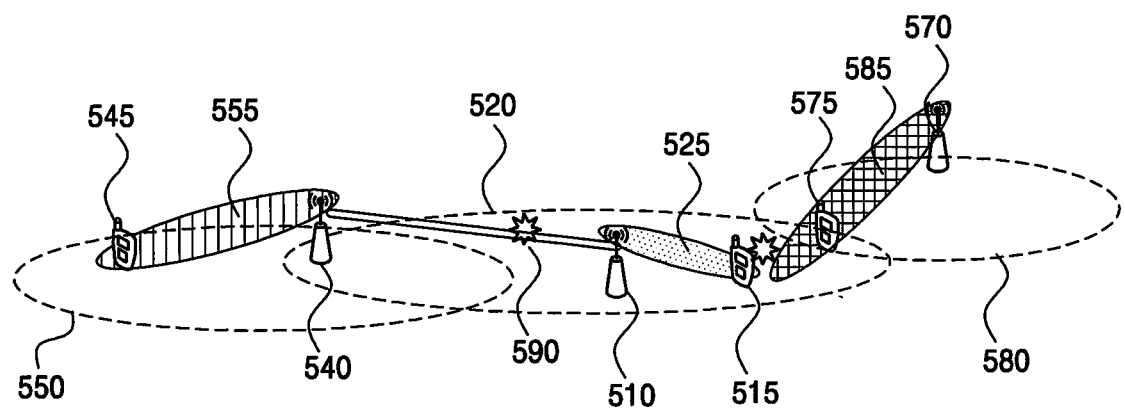
FIG. 5 is a view for describing a method of transmitting and receiving signals through an unlicensed spectrum in transmitting nodes or base stations and receiving nodes or user equipments (UEs), according to an embodiment of the disclosure.

FIG. 5 is a view for describing a method of transmitting and receiving signals through an unlicensed spectrum in transmitting nodes or base stations 510, 540, and 570 and receiving nodes or UEs 515, 545, and 575 according to an embodiment of the disclosure. Each transmitting node may calculate a threshold value by using Equation 2 or 3, and in FIG. 5, areas 520, 550, and 580 capable of receiving a signal corresponding to the threshold value are shown.

There may be a case in which a first base station 510 and a second base station 540 perform a channel access procedure with a threshold value calculated using Equation 2 or 3 without considering beams. In this case, when the first base station 510 transmits a signal to a first UE 515, the second base station 540 may receive the signal transmitted from the first base station 510 and compare intensity of the received signal to the threshold value to determine that an unlicensed spectrum is not in an idle state.

However, when the first base station 510 and the second base station 540 perform beamforming 525 and 555 toward directions of the first UE 515 and a second UE 545 to transmit signals, the first UE 515 and the second UE 545 may receive the signals from the first and second base stations 510 and 540 without any interference. Therefore, it may be determined that the unlicensed spectrum is in an idle state, in view of receivers. In other words, a transmitting node and a receiving node capable of transmitting and receiving signals by using a plurality of beams may make different determinations on whether an unlicensed spectrum is in an idle state. Therefore, the transmitting node and the receiving node may need to consider beams that are used to calculate a threshold value.

Also, in FIG. 5, the first base station 510 and a third base station 570 may calculate a threshold value and perform a channel access procedure in consideration of beams to determine that the unlicensed spectrum is in an idle state, and transmit signals respectively. However, because the first UE 515 may be influenced by a strong interference from the third base station 570, a beam may need to be considered when the threshold value is calculated. For example, a transmitting node using a plurality of beams may measure intensity of a signal received in a direction of a beam to be transmitted, and compare the intensity of the signal to a threshold value to determine whether an unlicensed spectrum is in an idle state. In this case, when a plurality of beams are used, a smaller threshold value may be used than when a single beam or an isotropic antenna is used, to measure intensity of a received signal over a wider range.

According to an embodiment of the disclosure, a method and apparatus capable of more efficiently using an unlicensed spectrum by enabling a transmitting node transmitting a signal or channel using a plurality of beams in the unlicensed spectrum to calculate a threshold value to be used in a channel access procedure in consideration of the plurality of beams may be provided.

A method of calculating a threshold value, proposed in embodiments of the disclosure, is not limited to being applied to the embodiments, and may be applied by using combinations of all or some content of the embodiments proposed in the disclosure. Also, the embodiments of the disclosure will be described under an assumption that a base station performs a channel access procedure. However, it will be obvious that the method of calculating the threshold value, proposed in the disclosure, may also be applied to a case in which a UE performs a channel access procedure.

Embodiment 1

A base station which performs communication by using a plurality of beams in an unlicensed spectrum may calculate a threshold value to be used for a channel access procedure by using the number of beams which the base station uses, according to Equation 4 below. For example, in the NR system, a synchronization signal block may be assumed to correspond to a beam. Accordingly, the number of beams may correspond to the number of synchronization signal blocks that a base station transmits. For example, in the current NR system, a maximum of 64 synchronization signal blocks may be transmittable for a specific time interval (for example, 5 ms) according to a frequency band, and the number L of the synchronization signal blocks to be transmitted may depend on a value of at least one of a subcarrier spacing of the synchronization signal blocks and a carrier frequency at which the synchronization signal blocks are transmitted.

As a more detailed example, in the time interval, a maximum of 4 synchronization signal blocks may be transmittable at a frequency band of 3 GHz or lower, a maximum of 8 synchronization signal blocks may be transmittable at a frequency band ranging from 3 GHz to 6 GHz, and a maximum of 64 synchronization signal blocks may be transmittable at a frequency band of 6 GHz or higher. The above-mentioned maximum numbers of synchronization signal blocks that are transmittable according to the frequency bands are only examples, and maximum numbers of synchronization signal blocks that are transmittable according to frequency bands may be defined as different values.

$$X\_thresh\_max = \max(T\_a, \min(T\_max, T\_max+T)) \quad \text{[Equation 4]}$$

In FIG. 4, $T\_a = -72 + 10 * \log 10(BWMHz/BW\_ref)$ dBm, $T = -T\_A - T\_B + (P\_H + 10 * \log 10(BWMHz/20 \text{ MHz}) - P\_tx)$, wherein T_B may be configured to a value depending on the number of beams, and T_B may be expressed in unit of dBm or dB. For example, T_B=0 when the number L of beams is a or less, T_B=X when a<L=b, T_B=Y when b<L=c, and T_B=Z when L>c. Herein, values of X, Y, and Z may have been defined in advance between a base station and a UE or may be configured by using PBCH, SIB, or a higher layer signal. The values of X, Y, and Z may have different values according to frequency bands or be independent. Also, the values of X, Y, and Z may be defined by regulatory requirements according to countries or frequency bands. Meanwhile, values of a, b, and c may have been defined in advance between the base station and the UE, or may be configured by using PBCH, SIB, or a higher layer signal. The values of a, b, and c may have different values according to frequency bands or may be independent. Also, the values of a, b, and c may be defined by regulatory requirements according to countries or frequency bands.

Meanwhile, the number L of beams may be determined as a maximum number of synchronization signal blocks defined in advance according to frequency bands. For example, in the current NR system, a maximum of 4 synchronization signal blocks may be transmittable at a frequency band of 3 GHz or lower, a maximum of 8 synchronization signal blocks may be transmittable at a frequency band ranging from 3 GHz to 6 GHz, and a maximum of 64 synchronization signal blocks may be transmittable at a frequency band of 6 GHz or higher, in the time interval. Therefore, the number L of beams may be one of 4, 8, and 64 according to frequency bands, and the values of a, b, and c may be 4, 8, and 64, respectively. Meanwhile, the base station or the UE may assume the maximum number of synchronization signal blocks to be L according to an unlicensed spectrum, and calculate a threshold value to be used for a channel access procedure by using Equation 4.

According to another method, the number L of beams may be determined to be the number of synchronization signal blocks that the base station actually transmits in a frequency band in which the base station attempts to transmit a signal. For example, in the current NR system, the base station may transmit time domain position information of a synchronization signal block that is actually transmitted or index information of the synchronization signal block that is actually transmitted, to UEs, by using a SIB or RRC signal which is shown below.

Accordingly, the base station may assume the number of synchronization signal blocks that the base station attempts to transmit in an unlicensed spectrum to be L, and calculate a threshold value that is used for a channel access procedure by using Equation 4. The UE may receive the time domain position information of the synchronization signal block transmitted through the SIB or RRC signal, infer or determine the number L of synchronization signal blocks actually transmitted by the base station or the number of the corresponding beams through the received time domain position information, and calculate a threshold value by using Equation 4 based on the L value.

<Example of Time Domain Position Information of a Synchronization Signal Block Included in SIB Information and Transmitted>

```
-- Time domain positions of the transmitted SS-blocks in an SS-Burst-Set
(see 38.213, section 4.1)
    ssb-PositionsInBurst          SEQUENCE {
        -- Indicates the presence of the up to 8 SSBs in one group
        inOneGroup                BIT STRING (SIZE (8)),
        -- For above 6 GHz: indicates which groups of SSBs is present
        groupPresence             BIT STRING (SIZE (8))
OPTIONAL -- Cond above6GHzOnly
    },
```

<Example of Time Domain Position Information of a Synchronization Signal Block Included in RRC Information>

```
-- Corresponds to L1 parameter 'SSB-Transmitted' (see 38.213,
    section 4.1)
    ssb-PositionsInBurst      CHOICE {
        -- bitmap for sub 3 GHz
        shortBitmap           BIT STRING (SIZE (4)),
        -- bitmap for 3-6 GHz
        mediumBitmap          BIT STRING (SIZE (8)),
        -- bitmap for above 6 GHz
        longBitmap            BIT STRING (SIZE (64))
```

Because a beam used to transmit a synchronization signal block and a beam used to transmit data may have different beam widths, etc., calculating a threshold value by using synchronization signal block information may be more suitable to a case in which the base station transmits a control signal or a control channel. For example, a method of calculating a threshold value according to the current embodiment may be applied to a channel access procedure that is performed in a case in which a base station transmits a synchronization signal block by using a plurality of beams. The current embodiment may be applied to calculating a threshold value in a channel access procedure that is performed to transmit a signal including data, as well as calculating a threshold value in a channel access procedure that is performed to transmit a control signal or a control channel.

At this time, it may also be possible to determine a type of a channel access procedure that is to be performed, according to the L value. For example, the channel access procedure of Type 2 may be determined to be performed when L is smaller than or equal to a or b, the channel access procedure of Type 1 may be determined to be performed when b<L=c, and the channel access procedure of Type 3 may be determined to be performed when L>c.

At this time, it may also be possible to determine a channel access priority class of the channel access procedure of Type 1 according to the L value. For example, channel access priority class 3 or 4 may be applied when L is smaller than or equal to a, channel access priority class 2 or 3 may be applied when a<L=b, channel access priority class 1 or 2 may be applied when b<L=c, and channel access priority class 1 may be applied when L>c.

At this time, T_A and T_B values may be represented as separate variables like Equation described above. According to another example, T_A and T_B values may be considered together to be represented as a single value T_C or as a function T(A, B) having, as its factors, variables for determining T_A and T_B values. The variable for determining the T_A value may relate to whether or not transmission includes data channel transmission, and the T_A value may be determined according to the variable.

Embodiment 2

A base station which performs communication by using a plurality of beams in an unlicensed spectrum may calculate a threshold value of a channel access procedure that is performed on a signal including at least synchronization signal block transmission by using a time period or the number of slots required to transmit a synchronization signal block which the base station attempts to transmit, according to Equation 5 below. Herein, the time period or the number of slots or symbols required to transmit the synchronization signal block may be determined based on a specific subcarrier spacing. For example, the time period or the number of slots required to transmit a synchronization signal block may be determined based on a slot length of a subcarrier spacing 30 kHz, and a threshold value may be calculated by using the time period or the number of slots.

$$X\_thresh\_max = \max(T\_a, \min(T\_max, T\_max+T)) \quad [\text{Equation 5}]$$

In FIG. 5, T_a=−72+10*log 10(BWMHz/BW_ref) dBm, T=−T_A−T_B+(P_H+10*log 10(BWMHz/20 MHz)−P_tx), wherein TB may be configured to a value depending on the time period or the number of slots required to transmit a synchronization signal block, and T_B may be expressed in unit of dBm or dB.

For example, the current NR system may be designed to transmit a maximum of 64 synchronization signal blocks for a specific time interval (for example, 5 ms). However, because a time period for which synchronization signal blocks are actually transmitted depends on frequency bands and a subcarrier spacing of the synchronization signal blocks, as shown in FIG. 4, T_B may be determined according to a time period required to transmit the synchronization signal blocks. For example, when a time period required to transmit a synchronization signal block is determined based on the number N of slots, T_B=0 when N=2 or less and T_B=X when N>2 in the case of a synchronization signal block having a subcarrier spacing of 15 kHz. In other words, by configuring T_B=0 when the number N of slots required to transmit a signal including a synchronization signal block is smaller than or equal to a, T_B=X when a<N=b, T_B=Y when b<N=c, and T_B=Z when N>c, a threshold value may be calculated.

At this time, values of X, Y, and Z may have been defined in advance between a base station and a UE, or may be configured by using PBCH, SIB, or a higher layer signal. The values of X, Y, and Z may have different values according to frequency bands or may be independent. Also, the values of X, Y, and Z may be defined by regulatory requirements according to countries or frequency bands. Meanwhile, values of a, b, and c may have been defined in advance between the base station and the UE, or may be configured by using PBCH, SIB, or a higher layer signal. The values of a, b, and c may have different values according to frequency bands or may be independent. Also, the values of a, b, and c may be defined by regulatory requirements according to countries or frequency bands.

The method of calculating the threshold value according to the current embodiment has been described in regard of a case of determining a threshold value for a channel access procedure that is performed when a base station transmits a signal including at least a synchronization signal block by using a plurality of beams. However, the method of calculating the threshold value, proposed according to the current embodiment, may also be applied to calculating a threshold value for a channel access procedure in a case of transmitting a signal including no synchronization signal block. For example, a T_B value may be determined according to a time period or the number of slots for which the base station attempts to transmit a signal through an unlicensed spectrum or a time period or the number of slots for which the base station attempts to occupy the unlicensed spectrum.

A type of a channel access procedure that is to be performed may be determined according to the N value. For example, the channel access procedure of Type 2 may be determined to be performed when N is smaller than or equal to a or b, the channel access procedure of Type 1 may be determined to be performed when b<N=c, and the channel access procedure of Type 3 may be determined to be performed when N>c. At this time, it may also be possible to determine a channel access priority class of the channel access procedure of Type 1 according to the N value. For example, the channel access priority class 3 or 4 may be applied when N is smaller than or equal to a, the channel access priority class 2 or 3 may be applied when a<N=b, the channel access priority class 1 or 2 may be applied when b<N=c, and the channel access priority class 1 may be applied when N>c.

At this time, T_A and T_B values may be represented as separate variables like Equation described above. According to another example, T_A and T_B values may be considered together to be represented as a single value T_C or as a function T(A, B) having, as its factors, variables for determining T_A and T_B values. The variable for determining the T_A value may relate to whether or not transmission includes data channel transmission, and the T_A value may be determined according to the variable.

Embodiment 3

A base station which performs communication by using a plurality of beams in an unlicensed spectrum may calculate a threshold value used for a channel access procedure by using the number of beams that the base station uses, according to Equation 6 below. For example, in the NR system, it may be assumed that non-zero power (NZP) CSI-RS used for channel state information (CSI) measurement corresponds to a beam. Also, in the NR system, it may be assumed that Non-zero power (NZP) CSI-RS configured for beam management corresponds to a beam.

Hereinafter, for convenience of description, the current embodiment will be described without distinguishing NZP CSI-RS for CSI measurement from NZP CSI-RS for beam management. Accordingly, the number of beams may correspond to the number of NZP CSI-RS transmitted from a base station. For example, in the current NR system, a transmission configuration up to a maximum of 64 NZP CSI-RS may be possible. However, the maximum number (for example, maxNrofCSI-SSB-ResourcePerSet or maxNrofNZP-CSI-RS-ResourcesPerSet) of NZP CSI-RS is only an example, and the maximum number of NZP CSI-RS may change or be defined as a different value.

$$X\_thresh\_max = \max(T\_a, \min(T\_max, T\_max+T)) \quad \text{[Equation 6]}$$

In Equation 6, $T\_a = -72 + 10 * \log 10(BWMHz/BW\_ref)$ dBm, $T = -T\_A - T\_B + (P\_H + 10 * \log 10(BWMHz/20 \text{ MHz}) - P\_tx)$, wherein T_B may be configured to a value depending on the number of beams or the number of NZP CSI-RS, and T_B may be expressed in unit of dBm or dB. For example, T_B=0 when the number L of beams is a or less, T_B=X when a<L=b, T_B=Y when b<L=c, and T_B=Z when L>c. Herein, values of X, Y, and Z may have been defined in advance between a base station and a UE or may be configured by using PBCH, SIB, or a higher layer signal. The values of X, Y, and Z may have different values according to frequency bands or may be independent. Also, the values of X, Y, and Z may be defined by regulatory requirements according to countries or frequency bands.

Meanwhile, values of a, b, and c may have been defined in advance between the base station and the UE, or may be configured by using PBCH, SIB, or a higher layer signal. The values of a, b, and c may have different values according to frequency bands or may be independent. Also, the values of a, b, and c may be defined by regulatory requirements according to countries or frequency bands.

The base station may configure NZP-CSI-RS for UEs by using a SIB or RRC signal. Accordingly, the base station may assume the number of NZP-CSI-RS to be transmitted in an unlicensed spectrum to be L, and calculate a threshold value to be used for a channel access procedure by using Equation 6. The UE may receive NZP-CSI-RS configuration information transmitted through the SIB or RRC signal, infer or determine the number of NZP-CSI-RS or the number of the corresponding beams through the received information, and calculate a threshold value by using Equation 6 based on the L value. More specifically, the UE may be configured at least one NZP-CSI-RS resource through NZP-CSI-RS-ResourceSet IE (information element) received through RRC. When repetition of NZP-CSI-RS-ResourceSet IE is OFF, the UE may assume that different beams are transmitted in the NZP-CSI-RS-Resource of NZP-CSI-RS-ResourceSet, and accordingly, the UE may infer or determine the number of the NZP-CSI-RS-Resource to be the number L of beams.

According to another example, the UE may be configured at least one CSI-SSB-ResourceList through CSI-SSB-ResourceSet IE received through RRC for beam management, and infer or determine the number L of beams through the CSI-SSB-ResourceList.

According to another example, the UE may be configured at least one CSI-SSB-ResourceList through CSI-SSB-ResourceSet IE received through RRC for beam management, and infer or determine the number L of beams through the CSI-SSB-ResourceList. At this time, the UE may determine a value (for example, 8, 16, 32 or 64) of maxNumberSSB-CSI-RS-ResourceOneTx or a value (for example, 0, 4, 8, 16, 32 or 64) maxNumberSSB-CSI-RS-ResourceTwoTx in BeamManagementSSB-CSI-RS IE received through RRC, or a maximum value of the two values to be the number L of beams. In the case of uplink transmission, the UE may determine a maximum number (for example, 8, 16, or 32 as a maxNumberSRS-ResourcePerSet value) of SRS resources configured through RRC to be the number L of beams, and calculate a threshold value.

At this time, a type of a channel access procedure that is to be performed may be determined according to the L value. For example, the channel access procedure of Type 2 may be determined to be performed when L is smaller than or equal to a or b, the channel access procedure of Type 1 may be determined to be performed when b<L=c, and the channel access procedure of Type 1 may be determined to be performed when L>c. At this time, it may also be possible to determine a channel access priority class of the channel access procedure of Type 1 according to the L value. For example, the channel access priority class 3 or 4 may be applied when L is smaller than or equal to a, the channel access priority class 2 or 3 may be applied when a<L=b, the channel access priority class 1 or 2 may be applied when b<L=c, and the channel access priority class 1 may be applied when L>c.

At this time, T_A and T_B values may be represented as separate variables like Equation described above. According to another example, the T_A and T_B values may be considered together to be represented as a single value T_C. According to still another example, the T_A and T_B values may be represented as a function T(A, B) having, as its factors, variables for determining T_A and T_B values. The variable for determining the T_A value may relate to whether or not transmission includes data channel transmission, and the T_A value may be determined according to the variable.

Embodiment 4

A base station which performs communication by using a plurality of beams in an unlicensed spectrum may calculate a threshold value used for a channel access procedure according to maximum transmit power of the base station in a direction of a beam that the base station attempts to transmit, according to Equation 7 below. For example, the maximum transmit power of the base station in the direction of the beam which the base station attempts to transmit may be determined by using rated beam EIRP. For a beam and beam direction pair that the base station declares, the rated beam EIRP is the maximum power that the base station can radiate in the beam direction pair. (✗ rated beam EIRP: For a declared beam and beam direction pair, the rated beam EIRP level is the maximum power that the base station is declared to radiate at the associated beam peak direction during the transmitter ON period). Herein, the beam direction pair means a group consisting of a beam center direction and a beam maximum direction, and the beam maximum direction is a direction enabling transmission at maximum EIRP.

$$X\_thresh\_max = max(T\_a, min(T\_max, T\_max+T)) \quad [\text{Equation 7}]$$

In Equation 7, $T\_a = -72 + 10 \cdot \log 10(BWMHz/BW\_ref)$ dBm, $T = -T\_A - T\_B + (P\_H + 10 \cdot \log 10(BWMHz/20 \text{ MHz}) - P\_tx)$, wherein T_B may be determined according to a related beam EIRP value, and T_B may be expressed in unit of dBm or dB. For example, T_B=0 when the related beam EIRP value is a or less, T_B=X when a<L≤b, T_B=Y when b<L≤c, and T_B=Z when L>c. Herein, values of X, Y, and Z may be values which the base station declares, may have been defined in advance between the base station and the UE, or may be configured by using PBCH, SIB, or a higher layer signal. The values of X, Y, and Z may have different values according to frequency bands or may be independent. Also, the values of X, Y, and Z may be defined by regulatory requirements according to countries or frequency bands.

Meanwhile, values of a, b, and c may have been defined in advance between the base station and the UE, or may be configured by using PBCH, SIB, or a higher layer signal. The values of a, b, and c may have different values according to frequency bands or may be independent. Also, the values of a, b, and c may be defined by regulatory requirements according to countries or frequency bands.

Determining a threshold value by using a related beam EIRP value is only an example, and a threshold value may be determined by using another variable related to a beam. For example, a threshold value may be determined by using a maximum EIRP value in a direction of a reference beam direction pair (reference beam direction pair: declared beam direction pair, including reference beam centre direction and reference beam peak direction where the reference beam peak direction is the direction for the intended maximum EIRP within the EIRP accuracy compliance directions set). For example, T_B=0 when a maximum EIRP value in a direction of a reference beam direction pair is smaller than or equal to a, T_B=0 when a<L≤b, T_B=X when a<L≤b, T_B=Y when b<L≤c, and T_B=Z when L>c. According to another example, a threshold value may be determined by using a value of a beamwidth (beam which a half-power contour that is essentially elliptical, the half-power beamwidths in the two pattern cuts that respectively contain the major and minor axis of the ipse), a value of BeW, REFSENS (beamwidth equivalent to the FR1 OTA REFSENS RoAoA in the Θ axis in degrees), or a value of BeWφ,REFSENS (beamwidth equivalent to the FR1 OTA REFSENS RoAoA in the φ-axis in degrees). For example, T_B=0 when the value of the beamwidth is smaller than or equal to a, T_B=X when a<L≤b, T_B=Y when b<L≤c, and T_B=Z when L>c.

Figure 6:
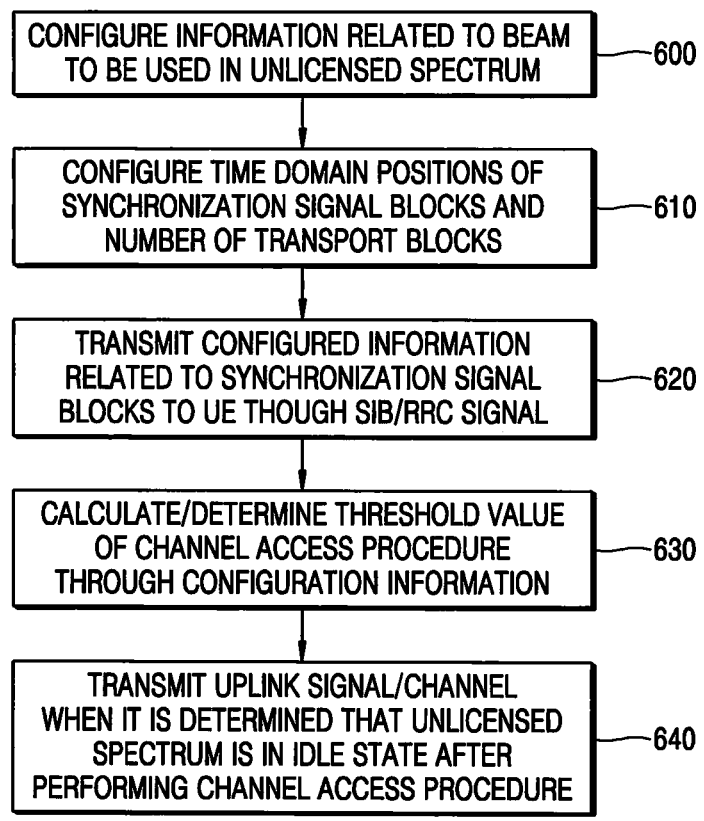
FIG. 6 is a flowchart for describing an operation of a base station according to an embodiment.

FIG. 6 is a flowchart for describing an operation of a base station according to an embodiment.

The base station may configure information related to a beam to be used in an unlicensed spectrum, in operation 600. The information related to the beam may include the number of beams that are to be used for signal or channel transmission, a synchronization signal block, NZP-CSI-RS, SRS, transmit power, etc.

In operation 610, the base station may configure information related to transmission of synchronization signal blocks, such as time domain positions of synchronization signal blocks to be transmitted in the unlicensed spectrum, a subcarrier spacing of the synchronization signal blocks, the number of the synchronization signal blocks, etc.

In operation 620, the base station may transmit the information related to synchronization signal blocks, configured in operation 610, to a UE though SIB or a higher layer signal.

In operation 630, the base station may calculate a threshold value used for a channel access procedure by using the information related to the beam and one of the above-described embodiments or a combination of one or more of the above-described embodiments.

When the base station attempts to transmit a signal or channel through the unlicensed spectrum, the base station may determine whether the unlicensed spectrum is in an idle state by using the threshold value calculated or determined in operation 630, and, when the base station determines that the unlicensed spectrum is in an idle state, the base station may transmit the signal or channel, in operation 640.

In FIG. 6, a method of calculating or determining a threshold value by using a synchronization signal block is assumed. However, the method may also be applied to a case of calculating or determining a threshold value by using NZP CSI-RS, a SRS resource, or an EIRP-related value.

At this time, a type of a channel access procedure that is to be performed may be determined according to a determined L value. For example, the channel access procedure of Type 2 may be determined to be performed when L is smaller than or equal to a or b, the channel access procedure of Type 1 may be determined to be performed when b<L≤c, and the channel access procedure of Type 3 may be determined to be performed when L>c. At this time, it may also be possible to determine a channel access priority class of the channel access procedure of Type 1 according to the determined L value. For example, the channel access priority class 3 or 4 may be applied when L is smaller than or equal to a, the channel access priority class 2 or 3 may be applied when a<L≤b, the channel access priority class 1 or 2 may be applied when b<L≤c, and the channel access priority class 1 may be applied when L>c.

At this time, T_A and T_B values may be represented as separate variables like Equation described above. According to another example, the T_A and T_B values may be considered together to be represented as a single value T_C or as a function T(A, B) having, as its factors, variables for determining T_A and T_B values. The variable for determining the T_A value may relate to whether or not transmission includes data channel transmission, and the T_A value may be determined according to the variable.

Figure 7:
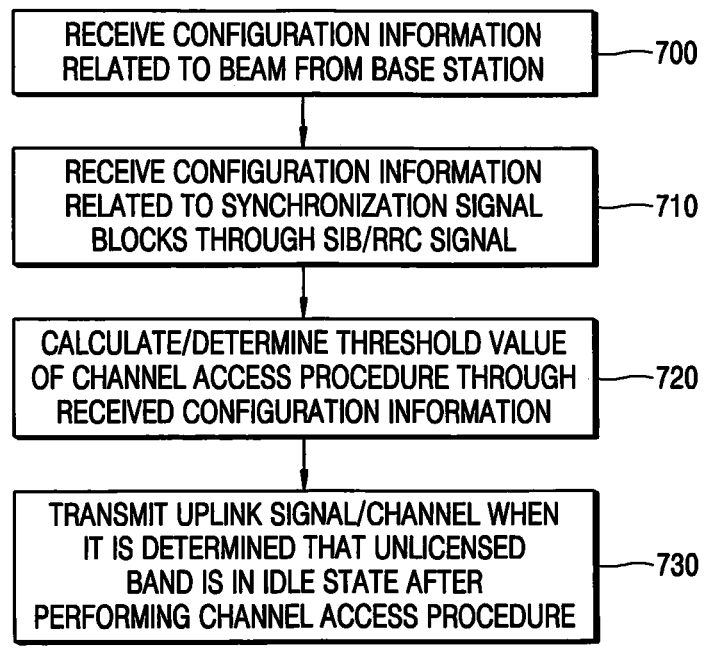
FIG. 7 is a flowchart for describing an operation of a UE according to an embodiment.

FIG. 7 is a flowchart for describing an operation of a UE according to an embodiment.

The UE may receive configuration information related to a beam to be used in an unlicensed spectrum, configured by a base station, in operation 700. The configuration information related to the beam may include the number of beams that the base station attempts to use for signal or channel transmission, a synchronization signal block, NZP-CSI-RS, SRS, transmit power, etc.

In operation 710, the UE may receive information related to transmission of synchronization signal blocks, such as time domain positions of synchronization signal blocks which the base station attempts to transmit in the unlicensed spectrum, a subcarrier spacing, the number of the synchronization signal blocks, etc. The UE may determine the number of synchronization signal blocks which the base station attempts to transmit by using time domain position information of synchronization signal blocks received through SIB or a higher layer signal from the base station.

In operation 720, the UE may calculate a threshold value used for a channel access procedure by using the configuration information related to the beam and one of the above-described embodiments or a combination of one or more of the above-described embodiments.

When the UE attempts to transmit a signal or channel through the unlicensed spectrum, the UE may determine whether the unlicensed spectrum is in an idle state by using the threshold value calculated or determined in operation 720, and, when the UE determines that the unlicensed spectrum is in an idle state, the UE may transmit the signal or channel, in operation 730.

In FIG. 7, a method of calculating or determining a threshold value by using synchronization signal blocks is assumed. However, the method described above with reference to FIG. 7 may also be applied to a case of calculating or determining the threshold value by using NZP CSI-RS, a SRS resource, or an EIRP-related value.

Figure 8:
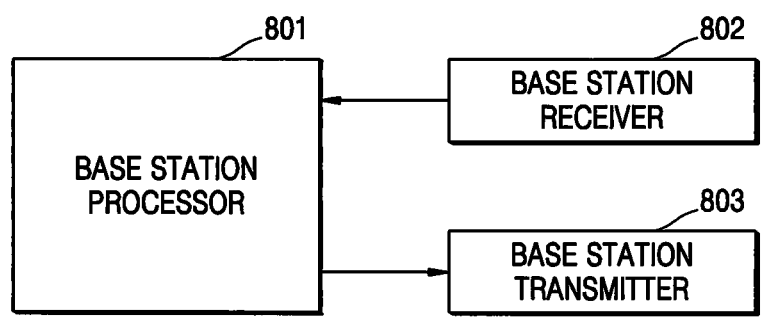
FIG. 8 is a block diagram of a base station according to an embodiment.

FIG. 8 is a block diagram of a base station according to an embodiment.

As shown in FIG. 8, the base station according to the disclosure may include a base station processor 801, a base station receiver 802, and a base station transmitter 803. The base station receiver 802 and the base station transmitter 803 are collectively referred to as a transceiver.

The transceiver may transmit/receive a signal to/from a UE. Herein, the signal may include control information and data. For this, the transceiver may be configured with an RF transmitter for up-converting and amplifying a frequency of a signal to be transmitted, an RF receiver for low-noise amplifying a received signal and down-converting a frequency of the received signal, etc. Also, the transceiver may receive a signal through a radio channel, output the signal to the base station processor 801, and transmit a signal output from the base station processor 801 through the radio channel. The base station processor 801 may control a series of processes to enable the base station to operate according to the above-described embodiments of the disclosure. For example, the base station receiver 802 may receive a data signal including a control signal transmitted from a UE, and the base station processor 801 may determine a reception result of the control signal and the data signal transmitted from the UE.

According to another example, the base station processor 801 may perform a channel access procedure for an unlicensed spectrum. More specifically, the base station receiver 802 may receive signals transmitted in the unlicensed spectrum, and the base station processor 801 may compare intensity, etc. of the received signals to a predefined threshold value or a threshold value determined by a function having, as its factor, a bandwidth, etc. to determine whether the unlicensed spectrum is in an idle state.

Also, the base station processor 801 may maintain or change a contention window value for a channel access procedure, according to the reception result of the data signal of the UE, received by the base station receiver 802. When the base station processor 801 determines that the unlicensed spectrum is in an idle state, the base station processor 801 may transmit a downlink signal including a synchronization signal block through the base station transmitter 803. At this time, the base station transmitter 803 may include information about an uplink or downlink transmission interval in a channel occupancy time of the unlicensed spectrum, determined by the base station processor 801, and transmit the information to the UE. Also, the base station may change information transmitted in PBCH of a synchronization signal block according to a transmission position of the synchronization signal block, and transmit the information to the UE.

Figure 9:
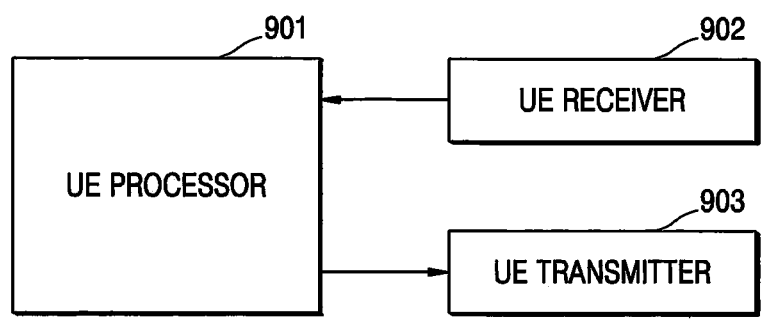
FIG. 9 is a block diagram of a UE according to an embodiment.

FIG. 9 is a block diagram of a UE according to an embodiment.

As shown in FIG. 9, the UE according to the disclosure may include a UE processor 901, a UE receiver 902, and a UE transmitter 903. The UE receiver 902 and the UE transmitter 903 are collectively referred to as a transceiver. The transceiver may transmit/receive a signal to/from a base station. Herein, the signal may include control information and data. For this, the transceiver may be configured with an RF transmitter for up-converting and amplifying a frequency of a signal to be transmitted, an RF receiver for low-noise amplifying a received signal and down-converting a frequency of the received signal, etc.

Also, the transceiver may receive a signal through a radio channel, output the signal to the UE processor 901, and transmit a signal output from the UE processor 901 through the radio channel. The UE processor 901 may control a series of processes to enable the UE to operate according to the above-described embodiments of the disclosure. For example, the UE receiver 902 may receive a data signal including a control signal, and the UE processor 901 may determine a reception result of the data signal. Thereafter, when the UE needs to transmit a first signal reception result including data reception to the base station at a specific timing, the UE transmitter 903 may transmit the first signal reception result to the base station at the specific timing determined in the UE processor 901.

As another example, when the UE receiver 902 receives information about a uplink or downlink transmission interval in a channel occupancy time of an unlicensed spectrum from the base station, the UE processor 901 may reconfigure or change a downlink control channel transmission time or period of the UE, and accordingly, the UE receiver 902 may receive a downlink control channel transmitted from the base station. Also, the UE may receive a reception result of uplink data transmitted by the UE transmitter 903 from the base station through the UE receiver 902, and the UE processor 901 may maintain or change a contention window value used for a channel access procedure for transmission of an unlicensed spectrum signal according to the reception result.

Also, the UE may receive a synchronization signal block transmitted from the base station through the UE receiver 902, and the UE processor 901 may acquire time synchronization with the base station according to the received synchronization signal block. At this time, the UE processor 901 may acquire a cell ID from the received synchronization signal block, decode PBCH of the synchronization signal block by using the acquired cell ID, and acquire time synchronization with the base station by using the acquired information.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Also, the embodiments may be combined and used as needed. For example, a base station and a UE may operate by combining some of the methods proposed in the disclosure. Also, the embodiments have been proposed based on LTE/LTE-A system, and modified examples based on the technical concept of the embodiments may also be applied to other system, such as 5G, NR system, etc.

The invention claimed is:

1. A channel access method of a user equipment (UE) in a wireless communication system, the method comprising:
obtaining beam configuration information from control information received from a base station (BS);
identifying at least one of a number of beams, a time period or a number of slots required to transmit a synchronization signal block, a number of channel-state information reference signals (CSI-RSs), or a maximum transmit power of the base station in a direction of a beam in which the base station attempts to transmit;
determining a threshold value used as a criterion for determining whether an unlicensed spectrum is in an idle state based on the identified at least one of the number of beams, the time period or the number of slots required to transmit the synchronization signal block, the number of CSI-RSs, or the maximum transmit power of the base station in the direction of the beam in which the base station attempts to transmit; and
comparing intensity of a signal received in the unlicensed spectrum to the threshold value to determine whether to transmit data in the unlicensed spectrum.

2. The method of claim 1, wherein obtaining the beam configuration information comprises determining the number of beams based on the control information received from the base station, and
wherein the threshold value is determined based on the number of beams.

3. The method of claim 2, wherein the number of beams is determined based on a maximum number of synchronization signal blocks configured in advance according to a frequency band or the number of synchronization signal blocks transmitted from the base station.

4. The method of claim 1, wherein obtaining the beam configuration information comprises determining the time period or the number of slots required to transmit the synchronization signal block based on the control information received from the base station, and
wherein the threshold value is determined based on the time period or the number of slots required to transmit the synchronization signal block.

5. The method of claim 1, wherein obtaining the beam configuration information comprises determining the number of channel-state information reference signals (CSI-RSs) based on the control information received from the base station, and
wherein the threshold value is determined based on the number of CSI-RSs.

6. The method of claim 1, wherein obtaining the beam configuration information comprises determining the maximum transmit power of the base station in a direction of the beam in which the base station attempts to transmit, based on the control information received from the base station, and
wherein the threshold value is determined based on the maximum transmit power of the base station in the direction of the beam.

7. A channel access method of a base station in a wireless communication system, comprising:
determining beam configuration information related to a beam to be transmitted in an unlicensed spectrum, wherein the beam configuration information indicates at least one of a number of beams, a time period or a number of slots required to transmit a synchronization signal block, a number of channel-state information reference signals (CSI-RSs), or a maximum transmit power of the base station in a direction of the beam in which the base station attempts to transmit;
transmitting control information including the beam configuration information to a user equipment (UE); and
receiving, when it is determined that the unlicensed spectrum is in an idle state according to a threshold value determined by the UE based on the beam configuration information indicating the at least one of the number of beams, the time period or the number of slots required to transmit the synchronization signal block, the number of CSI-RSs, or the maximum transmit power of the base station in the direction of the beam in which the base station attempts to transmit, data from the UE through the unlicensed spectrum,
wherein whether the unlicensed spectrum is in an idle state is determined based on a result of comparison between the intensity of a signal received by the UE in the unlicensed spectrum and the threshold value.

8. A user equipment (UE) for channel access in a wireless communication system, the UE comprising:
a transceiver; and
at least one processor,
wherein the at least one processor is configured to
obtain beam configuration information from control information received from a base station,
identify at least one of a number of beams, a time period or a number of slots required to transmit a synchronization signal block, a number of channel-state information reference signals (CSI-RSs), or a maximum transmit power of the base station in a direction of a beam in which the base station attempts to transmit,
determine a threshold value used as a criterion for determining whether an unlicensed spectrum is in an idle state, based on the identified at least one of the number of beams, the time period or the number of slots required to transmit the synchronization signal block, the number of CSI-RSs, or the maximum transmit power of the base station in the direction of the beam in which the base station attempts to transmit, and compare the intensity of a signal received in the unlicensed spectrum to the threshold value to determine whether to transmit data in the unlicensed spectrum.

9. The UE of claim 8, wherein the at least one processor is further configured to determine the number of beams based on the control information received from the base station, and wherein the threshold value is determined based on the number of beams.

10. The UE of claim 9, wherein the number of beams is determined based on a maximum number of synchronization signal blocks configured in advance according to a frequency band or the number of synchronization signal blocks transmitted from the base station.

11. The UE of claim 8, wherein the at least one processor is further configured to determine the time period or the number of slots required to transmit the synchronization signal block based on the control information received from the base station, and wherein the threshold value is determined based on the time period or the number of slots required to transmit the synchronization signal block.

12. The UE of claim 8, wherein the at least one processor is further configured to determine the number of CSI-RSs based on the control information received from the base station, and wherein the threshold value may be determined based on the number of CSI-RSs.

13. The UE of claim 8, wherein the at least one processor is further configured to determines the maximum transmit power of the base station in the direction of the beam which the base station attempts to transmit, based on the control information received from the base station, and wherein the threshold value is determined based on the maximum transmit power of the base station in the direction of the beam.

14. A base station for channel access in a wireless communication system, the base station comprising:

a transceiver; and at least one processor, wherein the at least one processor is configured to determine beam configuration information related to a beam to be transmitted in an unlicensed spectrum, wherein the beam configuration information indicates at least one of a number of beams, a time period or a number of slots required to transmit a synchronization signal block, a number of channel-state information reference signals (CSI-RSs), or a maximum transmit power of the base station in a direction of the beam in which the base station attempts to transmit, and transmit control information including the beam configuration information to a user equipment (UE), and control, when it is determined that the unlicensed spectrum is in an idle state based on a threshold value determined by the UE based on the beam configuration information indicating the at least one of the number of beams, the time period or the number of slots required to transmit the synchronization signal block, the number of CSI-RSs, or the maximum transmit power of the base station in the direction of the beam in which the base station attempts to transmit, the transceiver to receive data from the UE through the unlicensed spectrum, and wherein whether the unlicensed spectrum is in an idle state is determined based on a result of comparison between the intensity of a signal received by the UE in the unlicensed spectrum and the threshold value.

15. A non-transitory computer-readable recording medium having recorded thereon a computer program for executing a channel access method of a user equipment (UE) in a wireless communication system, the method comprising:

obtaining beam configuration information from control information received from a base station (BS);

identifying at least one of a number of beams, a time period or a number of slots required to transmit a synchronization signal block, a number of channel-state information reference signals (CSI-RSs), or a maximum transmit power of the base station in a direction of a beam in which the base station attempts to transmit;

determining a threshold value used as a criterion for determining whether an unlicensed spectrum is in an idle state based on the identified at least one of the number of beams, the time period or the number of slots required to transmit the synchronization signal block, the number of CSI-RSs, or the maximum transmit power of the base station in the direction of the beam in which the base station attempts to transmit; and comparing an intensity of a signal received in the unlicensed spectrum to the threshold value to determine whether to transmit data in the unlicensed spectrum.

* * * * *